US012698835B2

(12) United States Patent
Feng

(10) Patent No.: US 12,698,835 B2
(45) Date of Patent: Aug. 4, 2026

(54) BONDED SEAT VALVE

(71) Applicant: Mueller International, LLC, Atlanta, GA (US)

(72) Inventor: Xianhua Feng, Jingmen City (CN)

(73) Assignee: Mueller International, LLC, Atlanta, GA (US)

( * ) Notice: Subject to any disclaimer, the term of this patent is extended or adjusted under 35 U.S.C. 154(b) by 84 days.

(21) Appl. No.: 18/195,101

(22) Filed: May 9, 2023

(65) Prior Publication Data

US 2023/0279953 A1 Sep. 7, 2023

Related U.S. Application Data

(63) Continuation of application No. 17/266,913, filed as application No. PCT/CN2021/074093 on Jan. 28, 2021, now Pat. No. 11,686,394.

(51) Int. Cl.
| | |
|---|---|
| *F16K 1/42* | (2006.01) |
| *F16K 1/20* | (2006.01) |
| *F16K 1/226* | (2006.01) |
| *F16K 1/36* | (2006.01) |
| *F16K 1/44* | (2006.01) |

(Continued)

(52) U.S. Cl.
CPC ............. *F16K 1/42* (2013.01); *F16K 1/2057* (2013.01); *F16K 1/2265* (2013.01); *F16K 1/2268* (2013.01); *F16K 1/36* (2013.01); *F16K 1/44* (2013.01); *F16K 1/465* (2013.01); *F16K 41/026* (2013.01)

(58) Field of Classification Search
CPC ...... F16K 1/2263; F16K 1/2268; F16K 1/425; F16K 27/0218; F16K 27/0272
See application file for complete search history.

(56) References Cited

U.S. PATENT DOCUMENTS

| | | | |
|---|---|---|---|
| 2,923,524 A | 2/1960 | Fawkes | |
| 2,940,725 A | 6/1960 | Nagel | |

(Continued)

FOREIGN PATENT DOCUMENTS

| | | |
|---|---|---|
| CA | 3009537 | 11/2020 |
| CN | 1380952 | 11/2002 |

(Continued)

OTHER PUBLICATIONS

Machine English translation of EP0572333A1 (Year: 2024).*

(Continued)

*Primary Examiner* — Hailey K. Do
(74) *Attorney, Agent, or Firm* — Smith, Gambrell & Russell, LLP

(57) ABSTRACT

A valve seat includes a first end; a second end positioned opposite from the first end; and a body extending from the first end to the second end, the body defining an inner surface and an outer surface, the inner surface defining a main bore extending through the body from the first end to the second end, the main bore defining a main bore axis, the body defining a shaft bore extending from the inner surface to the outer surface, the shaft bore defining a shaft bore axis positioned perpendicular to the main bore axis, the shaft bore defining an inner shaft opening and an outer shaft opening, the body defining a concave seat bearing surface extending around the inner shaft opening.

15 Claims, 14 Drawing Sheets

(51) Int. Cl.
*F16K 1/46* (2006.01)
*F16K 41/02* (2006.01)

(56) References Cited

U.S. PATENT DOCUMENTS

| | | | |
|---|---|---|---|
| 3,024,802 A | 3/1962 | Stillwagon | |
| 3,173,650 A | 3/1965 | Cotterman et al. | |
| 3,241,806 A | 3/1966 | Snell | |
| 3,311,128 A | 3/1967 | Taylor | |
| 3,420,498 A | 1/1969 | Housworth | |
| 3,521,856 A | 7/1970 | Smith | |
| 3,556,476 A | 1/1971 | Haenky | |
| 3,633,872 A | 1/1972 | Wright | |
| 3,642,247 A | 2/1972 | Scaramucci | |
| 3,647,180 A | 3/1972 | Church | |
| 3,675,888 A | 7/1972 | Scaramucci | |
| 3,727,883 A | 4/1973 | Conners | |
| 3,771,764 A | 11/1973 | Miyauchi | |
| 3,884,266 A | 5/1975 | Kondo | |
| 4,006,882 A | 2/1977 | Bonafous | |
| 4,025,050 A | 5/1977 | Manki | |
| 4,055,323 A | 10/1977 | Gachot | |
| 4,113,268 A | 9/1978 | Simmons et al. | |
| 4,133,513 A | 1/1979 | Meyer | |
| 4,227,675 A | 10/1980 | Sutter et al. | |
| 4,230,139 A | 10/1980 | Scaramucci | |
| 4,266,754 A | 5/1981 | Ninomiya | |
| 4,410,003 A | 10/1983 | Sandling | |
| 4,418,889 A | 12/1983 | Krause | |
| 4,428,561 A | 1/1984 | Thompson | |
| 4,516,597 A | 5/1985 | Ueda | |
| 4,659,064 A | 4/1987 | Scobie et al. | |
| 4,740,347 A * | 4/1988 | Sloan, Jr. | B29C 45/14 |
| | | | 29/469 |
| 4,886,241 A | 12/1989 | Davis et al. | |
| 4,998,708 A | 3/1991 | Pavanel | |
| 5,150,731 A | 9/1992 | Jiro | |
| 5,152,501 A | 10/1992 | Raymond, Jr. | |
| 5,267,722 A | 12/1993 | Coulter | |
| 5,326,074 A | 7/1994 | Spock, Jr. et al. | |
| 5,695,170 A | 12/1997 | Dernovsek et al. | |
| 5,707,040 A | 1/1998 | Gasaway | |
| 5,871,203 A | 2/1999 | Gasaway | |
| 5,918,857 A | 7/1999 | Wattignier et al. | |
| 5,975,494 A | 11/1999 | Gasaway | |
| 6,361,051 B1 | 3/2002 | Babin | |
| 6,622,987 B2 | 9/2003 | Sterud | |
| 6,926,007 B2 | 8/2005 | Frank | |
| 7,017,915 B2 | 3/2006 | Dorrian et al. | |
| 7,090,193 B2 | 8/2006 | Kamesawa | |
| 7,201,182 B2 | 4/2007 | Eernisse | |
| 7,621,292 B2 | 11/2009 | Eernisse | |
| 7,963,503 B2 | 6/2011 | Day | |
| 8,336,854 B2 | 12/2012 | Cassina | |
| 8,348,236 B2 | 1/2013 | Stefani et al. | |
| 8,430,113 B2 | 4/2013 | Suetome et al. | |
| 8,496,227 B2 | 7/2013 | McCoy et al. | |
| 8,565,394 B2 | 10/2013 | Lopez | |
| 8,857,792 B2 | 10/2014 | Parrie et al. | |
| 8,899,257 B2 | 12/2014 | Grimwade et al. | |
| 10,267,424 B2 | 4/2019 | Abouelleil | |
| 10,378,656 B2 | 8/2019 | Abouelleil | |
| 10,794,494 B2 | 10/2020 | Abouelleil et al. | |
| 10,844,964 B2 | 11/2020 | Abquelleil et al. | |
| 11,686,394 B2 | 6/2023 | Feng | |
| 2002/0074040 A1 | 6/2002 | Schwarz | |
| 2003/0209683 A1 | 11/2003 | Chi-Lung | |
| 2005/0184267 A1 | 8/2005 | Kamesawa | |
| 2009/0039305 A1 | 2/2009 | Shakogori et al. | |
| 2010/0102262 A1 | 4/2010 | Helfer | |
| 2011/0079743 A1 | 4/2011 | Tsai | |
| 2011/0166255 A1 | 7/2011 | Noguchi et al. | |
| 2015/0053880 A1 | 2/2015 | Jackson | |
| 2015/0258730 A1 | 9/2015 | Lee | |
| 2016/0178067 A1 | 6/2016 | Abouelleil | |
| 2016/0348800 A1 | 12/2016 | Abouelleil | |
| 2017/0234436 A1 * | 8/2017 | Abouelleil | F16K 27/02 |
| | | | 251/306 |
| 2018/0149278 A1 | 5/2018 | Abouelleil et al. | |
| 2019/0101214 A1 | 4/2019 | Abouelleil et al. | |
| 2019/0145526 A1 | 5/2019 | Abouelleil et al. | |
| 2019/0309857 A1 | 10/2019 | Abouelleil et al. | |
| 2019/0316684 A1 | 10/2019 | Abouelleil et al. | |
| 2019/0331230 A1 * | 10/2019 | Yamamoto | F16K 1/224 |
| 2022/0235867 A1 | 7/2022 | Feng | |

FOREIGN PATENT DOCUMENTS

| | | | | |
|---|---|---|---|---|
| CN | 102089399 | 6/2011 | | |
| CN | 203239950 | 10/2013 | | |
| CN | 203477351 | 3/2014 | | |
| DE | 3602425 | 7/1987 | | |
| EP | 0572333 A1 * | 12/1993 | | F16K 1/2265 |
| FR | 1522379 | 4/1968 | | |
| FR | 2398239 | 2/1979 | | |
| GB | 2033058 A * | 5/1980 | | F16K 1/2265 |
| GB | 1574489 | 9/1980 | | |
| JP | H11218235 | 8/1999 | | |
| JP | 2007177813 | 7/2007 | | |
| NL | 8301127 A * | 7/1984 | | F16K 1/2263 |
| WO | 2016099693 | 6/2016 | | |
| WO | 2017139038 | 8/2017 | | |
| WO | 2018102072 | 6/2018 | | |
| WO | 2022160161 | 8/2022 | | |

OTHER PUBLICATIONS

Machine English translation of FR1522379 (Year: 2025).*
Machine English translation of NL-8301127-A (Year: 2026).*
Pratt Industrial; Brochure for "BF Series Wafer/Lug Butterfly Valves", copyright 2014, 12 pgs.
Abouelleil, Ashraf; International Preliminary Report on Patentability for PCT Application No. PCT/US17/59926, filed Nov. 3, 2017, mailed Jun. 13, 2019, 7 pgs.
Feng, Xianhua; International Preliminary Report on Patentability for PCT/CN2021/074093, filed Jan. 28, 2021, mailed Aug. 10, 2023, 5 pgs.
Abouelleil, Ashraf; Office Action for Canadian patent application No. 3,039,994, filed Nov. 3, 2017, mailed Dec. 6, 2023, 4 pgs.
Abouelleil, Ashraf; Advisory Action for U.S. Appl. No. 14/573,287, filed Dec. 17, 2014, mailed Jan. 10, 2017, 3 pgs.
Abouelleil, Ashraf; Applicant Initiated Interview Summary for U.S. Appl. No. 14/573,287, filed Dec. 17, 2014, mailed Jun. 23, 2016, 3 pgs.
Abouelleil, Ashraf; Applicant Initiated Interview Summary for U.S. Appl. No. 14/573,287, filed Dec. 17, 2014, mailed Aug. 12, 2016, 3 pgs.
Abouelleil, Ashraf; Applicant Initiated Interview Summary for U.S. Appl. No. 14/573,287, filed Dec. 17, 2014, mailed May 8, 2017, 3 pgs.
Abouelleil, Ashraf; Applicant-Initiated Interview Summary for U.S. Appl. No. 14/573,287, filed Dec. 17, 2014, mailed Mar. 14, 2018, 3 pgs.
Abouelleil, Ashraf; Final Office Action for U.S. Appl. No. 14/573,287, filed Dec. 17, 2014, mailed Nov. 8, 2016, 16 pgs.
Abouelleil, Ashraf; Final Office Action for U.S. Appl. No. 14/573,287, filed Dec. 17, 2014, mailed May 14, 2018, 30 pgs.
Abouelleil, Ashraf; Final Office Action for U.S. Appl. No. 14/573,287, filed Dec. 17, 2017, mailed Oct. 3, 2017, 26 pgs.
Abouelleil, Ashraf; Non-Final Office Action for U.S. Appl. No. 14/573,287, filed Dec. 17, 2014, mailed May 27, 2016, 21 pgs.
Abouelleil, Ashraf; Non-final Office Action for U.S. Appl. No. 14/573,287, filed Dec. 17, 2014, mailed Apr. 3, 2017, 15 pgs.
Abouelleil, Ashraf; Non-Final Office Action for U.S. Appl. No. 14/573,287, filed Feb. 17, 2014, mailed Jan. 12, 2018, 25 pgs.
Abouelleil, Ashraf; Applicant-Initiated Interview Summary for U.S. Appl. No. 15/042,205, filed Feb. 12, 2016, mailed May 30, 2017, 2 pgs.

(56)                    References Cited

OTHER PUBLICATIONS

Abouelleil, Ashraf; Final Office Action for U.S. Appl. No. 15/042,205, filed Feb. 12, 2016, mailed Oct. 20, 2017, 29 pgs.

Abouelleil, Ashraf; Final Office Action for U.S. Appl. No. 15/042,205, filed Feb. 12, 2016, mailed Nov. 1, 2018, 32 pgs.

Abouelleil, Ashraf; Non-Final Office Action for U.S. Appl. No. 15/042,205, filed Feb. 12, 2016, mailed Apr. 6, 2018, 25 pgs.

Abouelleil, Ashraf, Non-final Office Action for U.S. Appl. No. 15/042,205, filed Feb. 12, 2016, mailed Apr. 5, 2017, 39 pgs.

Abouelleil, Ashraf; Notice of Allowance for U.S. Appl. No. 15/042,205, filed Feb. 12, 2016, mailed Jan. 14, 2019, 9 pgs.

Abouelleil, Ashraf; International Preliminary Report on Patentability for Application Serial No. PCT/US15/59514, filed Nov. 6, 2015, mailed Jun. 29, 2017, 7 pgs.

Abouelleil, Ashraf; International Search Report and Written Opinion for serial No. PCT/US15/59514, filed Nov. 6, 2015, mailed Mar. 2, 2016, 8 pgs.

Abouelleil, Ashraf; Examination Report for UAE application No. P6000718/2017, filed Nov. 6, 2015, mailed Feb. 28, 2021, 4 pgs.

Abouelleil, Ashraf; Search Report for UAE application No. P6000718/2017, filed Nov. 6, 2015, mailed Feb. 28, 2021, 4 pgs.

Abouelleil, Ashraf; International Preliminary Report on Patentability for PCT Application No. PCT/US2016/068689, filed Dec. 27, 2016, mailed Aug. 23, 2018, 14 pgs.

Abouelleil, Ashraf; International Search Report and Written Opinion for PCT Application No. PCT/US16/68689, filed Dec. 27, 2016, mailed Mar. 17, 2017, 15 pgs.

Abouelleil, Ashraf; Office Action for Canadian application No. 3,009,537, filed Feb. 27, 2016, mailed Sep. 20, 2019, 4 pgs.

Abouelleil, Ashraf; Final Office Action for U.S. Appl. No. 15/363,410, filed Nov. 29, 2016, mailed Apr. 18, 2019, 27 pgs.

Abouelleil, Ashraf; Non-Final Office Action for U.S. Appl. No. 15/363,410, filed Nov. 29, 2016, mailed Oct. 4, 2018, 42 pgs.

Abouelleil, Ashraf; Requirement for Restriction/Election for U.S. Appl. No. 15/363,410, filed Nov. 29, 2016, mailed Jun. 29, 2018, 6 pgs.

Article entitled: "Lubricant LUBE-2", located at <http://xn-0hv178atlu.com/en/product.asp?id=495>, dated Jun. 4, 2014, 1 pg.

Abouelleil, Ashraf; Applicant-Initiated Interview Summary for U.S. Appl. No. 15/808,936, filed Nov. 10, 2017, mailed Feb. 4, 2019, 3 pgs.

Abouelleil, Ashraf; Non-Final Office Action for U.S. Appl. No. 15/808,936, filed Nov. 10, 2017, mailed Dec. 19, 2018, 22 pgs.

Abouelleil, Ashraf; Notice of Allowance for U.S. Appl. No. 15/808,936, filed Nov. 10, 2017, mailed Apr. 3, 2019, 9 pgs.

Abouelleil, Ashraf; Applicant-Initiated Interview Summary for U.S. Appl. No. 16/456,608, filed Jun. 28, 2019, mailed Sep. 25, 2020, 3 pgs.

Abouelleil, Ashraf; Non-Final Office Action for U.S. Appl. No. 16/456,608, filed Jun. 28, 2019, mailed Jul. 8, 2020, 13 pgs.

Abouelleil, Ashraf; Notice of Allowance for U.S. Appl. No. 16/456,608, filed Jun. 28, 2019, mailed Oct. 13, 2020, 9 pgs.

Abouelleil, Ashraf; Final Office Action for U.S. Appl. No. 15/949,194, filed Apr. 10, 2018, mailed Oct. 25, 2019, 25 pgs.

Abouelleil, Ashraf; Non-Final Office Action for U.S. Appl. No. 15/949,194, filed Apr. 10, 2018, mailed Feb. 21, 2020, 22 pgs.

Abouelleil, Ashraf; Non-Final Office Action for U.S. Appl. No. 15/949,194, filed Apr. 10, 2018, mailed Apr. 18, 2019, 15 pgs.

Abouelleil, Ashraf; Notice of Allowance for U.S. Patent Application No. 15/949, 194, filed Apr. 10, 2018, mailed Mar. 26, 2020, 8 pgs.

Abouelleil, Ashraf; International Search Report for PCT Application No. PCT/US17/59926, filed Nov. 3, 2017, Jan. 19, 2018, 8 pgs.

Abouelleil, Ashraf; Office Action for Chinese patent application No. 201780073279.8, filed May 27, 2019, mailed Nov. 27, 2019, 17 pgs.

Abouelleil, Ashraf; Office Action for Chinese patent application No. 201780073279.8, filed May 27, 2019, mailed Jun. 12, 2020, 12 pgs.

Feng, Xianhua; Final Office Action for U.S. Appl. No. 17/266,913, filed Feb. 8, 2021, mailed Oct. 12, 2022, 15 pgs.

Feng, Xianhua; Notice of Allowance for U.S. Appl. No. 17/266,913, filed Feb. 8, 2021, mailed Feb. 10, 2023, 13 pgs.

Feng, Xinhua; Non-Final Office Action for U.S. Appl. No. 17/266,913, filed Feb. 8, 2021, mailed Apr. 14, 2022, 33 pgs.

Machine English translation of FR 1522379 sourced from Espacenet (Year: 2022).

Feng, Xianhua; International Search Report and Written Opinion for PCT/CN2021/074093, filed Jan. 28, 2021, mailed Nov. 3, 2021, 10 pgs.

AS Article entitled: "V Packing Made of PTFE", located at <http://www.americansealandpacking.com/ptfev.htm>, publicly available prior to Nov. 10, 2017, 2 pgs.

Forum Energy Technologies; Brochure for 709/719 Resilient Seated Butterfly Valves, publicly available prior to Nov. 10, 2017, 4 pgs.

Henry Pratt Company; Brochure for AWWA Butterfly Valves 3"-20", copyright 2016, 12 pgs.

Henry Pratt Company; Operating Manual for 3"-20" Bonded Seat Butterfly Valves, published Jan. 2017, 9 pgs.

* cited by examiner

BONDED SEAT VALVE

CROSS-REFERENCE TO RELATED APPLICATIONS

This application is a continuation of U.S. application Ser. No. 17/266,913, filed Feb. 8, 2021, which claims priority to PCT Application CN2021/074093, filed Jan. 28, 2021, which are each hereby incorporated in their entirety by reference.

TECHNICAL FIELD

This disclosure relates to seats for valves. More specifically, this disclosure relates to a bonded seat for a valve.

BACKGROUND

Valves often have a valve member housed within a valve body, and a valve seat positioned between the valve member and the valve body to form a seal when the valve is placed in a closed configuration. Examples of common valve members include the ball of a ball valve, the disc of a butterfly valve, or the gate of a gate valve. The seat often is made of a resilient member that elastically deforms due to contact with the valve member to form the seal between the valve member and the seat. The elastic deformation produces pressure and friction between the seat and the valve member. Increasing the interference between the valve member and the seat can increase the seal strength and pressure rating of the valve, but doing so also typically increases the friction on the valve member when opening and closing the valve, particularly when the valve is subjected to a pressure differential across the valve member as is often the case when the valve is in the closed position. As the force of friction increases, the valves can become difficult and/or time consuming to operate. Such valves may require manual gearboxes or powered valve actuators because the force required to open the valve is too great for a simple quarter-turn valve handle to be turned manually.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a valve seat comprising a first end; a second end positioned opposite from the first end; and a body extending from the first end to the second end, the body defining an inner surface and an outer surface, the inner surface defining a main bore extending through the body from the first end to the second end, the main bore defining a main bore axis, the body defining a shaft bore extending from the inner surface to the outer surface, the shaft bore defining a shaft bore axis positioned perpendicular to the main bore axis, the shaft bore defining an inner shaft opening and an outer shaft opening, the body defining a concave seat bearing surface extending around the inner shaft opening.

Also disclosed a valve comprising a valve seat defining an inner seat surface and an outer seat surface, a shaft bore extending through the valve seat from the inner seat surface to the outer seat surface, an inner shaft opening of the shaft bore defined at the inner seat surface, the inner seat surface defining a concave seat bearing surface extending around the inner shaft opening; and a valve member defining an end engaging the concave seat bearing surface, the end defining a valve member end surface, the valve member end surface defining a convex shape.

Also disclosed is a valve seat comprising a body defining an inner surface and an outer surface, the inner surface defining a main bore extending through the body, the body defining a shaft bore extending from the inner surface to the outer surface, the shaft bore defining an inner shaft opening, the body defining a concave seat bearing surface extending around the inner shaft opening.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
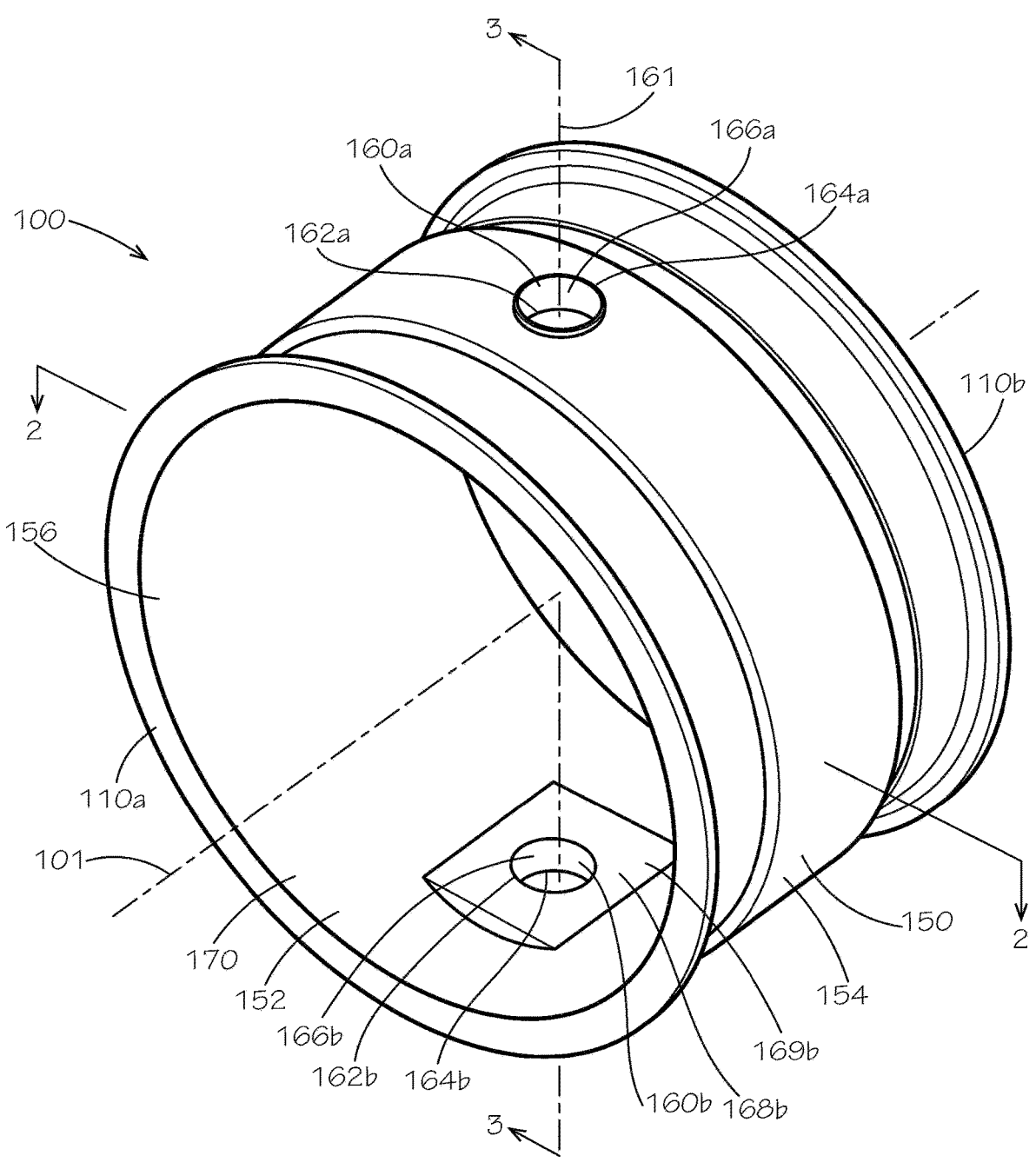
FIG. 1 is a perspective view of a prior art valve seat comprising a first end, and second end, and a body.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a valve seat and associated methods, systems, devices, and various apparatus. The valve seat can comprise a first end, a second end, and a body. It would be understood by one of skill in the art that the disclosed valve seat is described in but a few exemplary aspects among many. No particular terminology or description should be considered limiting on the disclosure or the scope of any claims issuing therefrom.

Figure 2:
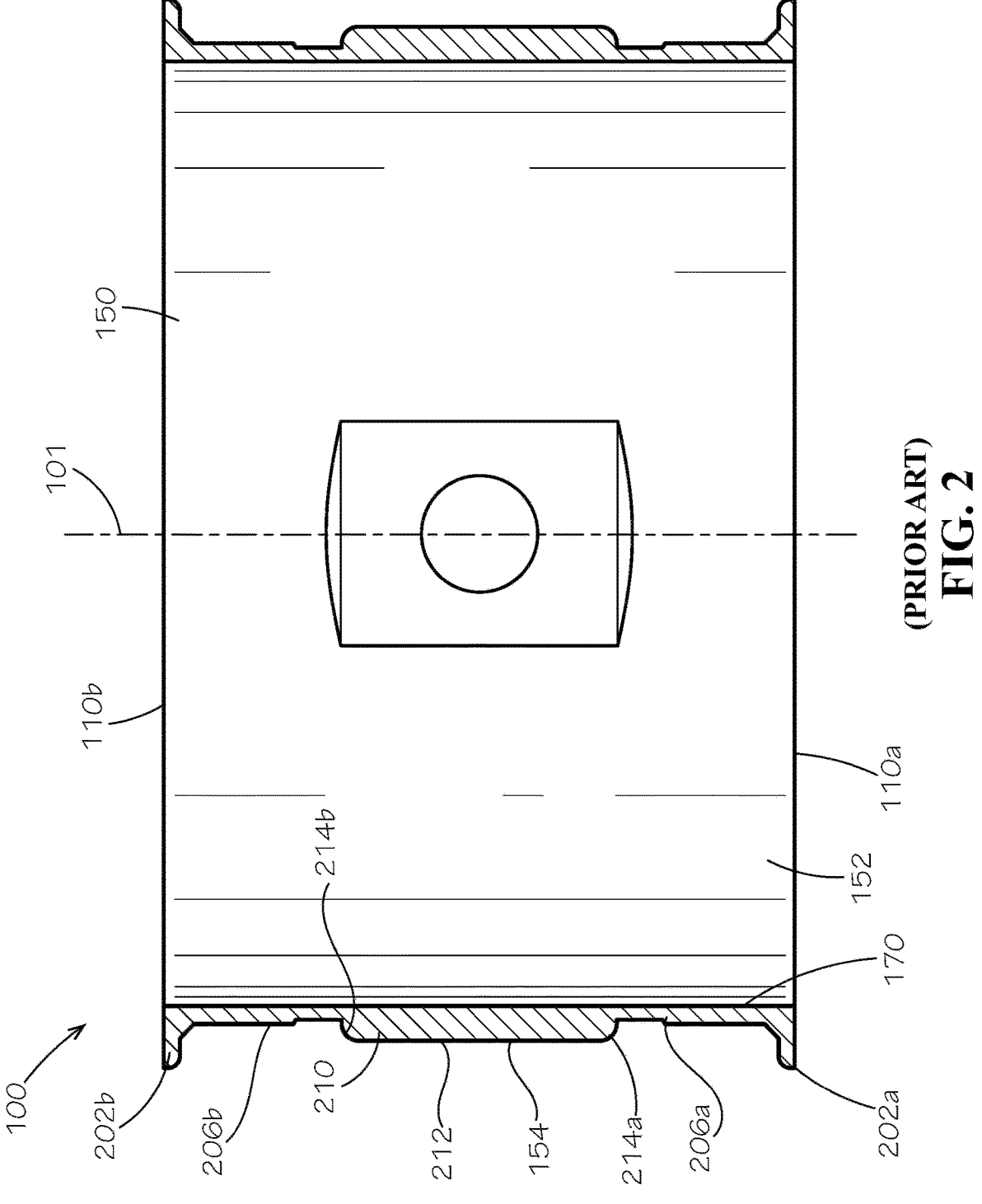
FIG. 2 is a cross-sectional view of the prior art valve seat of FIG. 1, taken along line 2-2 shown in FIG. 1.
Figure 3:
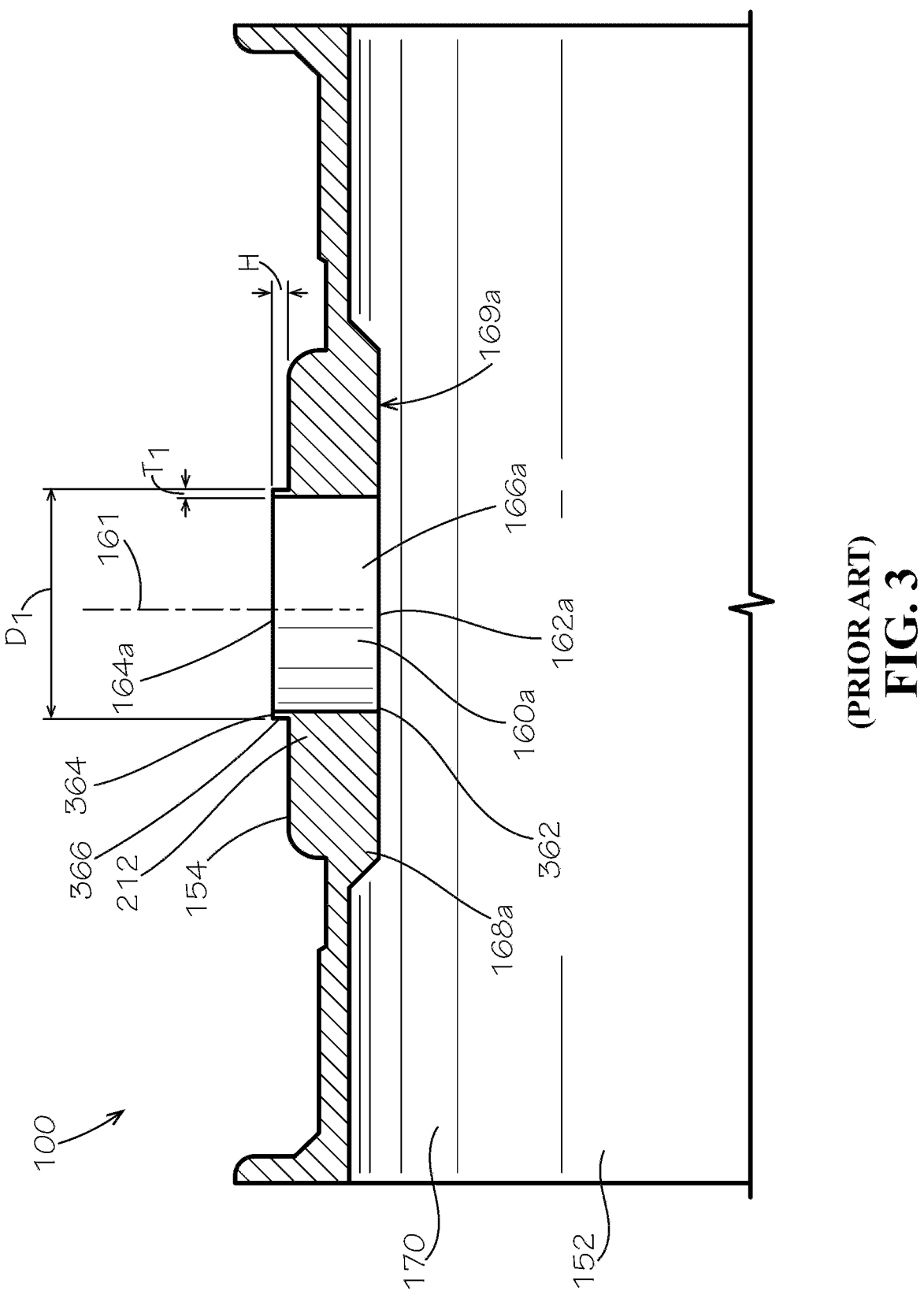
FIG. 3 is a detailed cross-sectional view of an upper shaft bore of the prior art valve seat of FIG. 1, taken along line 3-3 shown in FIG. 1.

In overview, FIGS. 1-3 depict a prior art valve seat 100. In particular, the valve seat shown is from a Model 12" 2F2 250B BFV butterfly valve made by Jingmen Pratt Valve Co. Ltd., headquartered in Hubei, China. FIGS. 4 and 6-9B depict various aspects of a valve 400 comprising an improved valve seat 100' (referred to as "valve seat 100'" hereafter), which can demonstrate various improvements over the prior art valve seat 100 in various aspects. FIGS. 5, 10A, and 10B provide various views of the valve seat 100' of FIG. 4.

Turning to the individual figures, FIG. 1 is a perspective view of the prior art valve seat 100 comprising a first end 110a, a second end 110b, and a body 150. The body 150 can extend from the first end 110a to the second end 110b. The body 150 can define an inner seat surface 152 and an outer seat surface 154.

The inner seat surface 152 can define a main bore 156 extending through the body 150 from the first end 110a to the second end 110b. The main bore 156 can define a main bore axis 101. The body 150 can define an upper shaft bore 160a and a lower shaft bore 160b, each extending through the body 150 from the inner seat surface 152 to the outer seat surface 154. The shaft bores 160a,b can share a common shaft bore axis 161. The shaft bore axis 161 can be perpendicular to the main bore axis 101. Each shaft bore 160a can respectively define an inner shaft opening 162a,b and an outer shaft opening 164a,b, such that each inner shaft opening 162a,b can be positioned between the adjacent respective outer shaft opening 164a,b and the main bore axis 101. Each shaft bore 160a,b can respectively define a shaft bore surface 166a,b extending between the respective shaft openings 162a,b, 164a,b. The shaft bore surfaces 166a,b can be cylindrical.

The inner seat surface 152 can define a cylindrical portion 170 and a pair of bearing pads 168a,b (bearing pad 168a shown in FIG. 3). The cylindrical portion 170 of the inner seat surface 152 can be substantially cylindrical. The bearing pads 168a,b can define a pair of seat bearing surfaces 169a,b (seat bearing surface 169a shown in FIG. 3) extending around the respective inner shaft openings 162a,b. The inner shaft openings 162a,b can each be defined at an intersection between the respective shaft bore surfaces 166a,b and the respective seat bearing surfaces 169a,b. The seat bearing surfaces 169a,b can be planar, and the seat bearing surfaces 169a,b can be normal to the shaft bore axis 161, as shown in greater detail in FIG. 3.

FIG. 2 is a cross-sectional view of the prior art valve seat 100 of FIG. 1, taken along line 2-2 shown in FIG. 1. The body 150 can define a flange lip 202a,b at the ends 110a,b, respectively. The body 150 can define a sealing portion 210 axially centered between the ends 110a,b relative to the main bore axis 101. The body 150 can define a pair of bore portions 206a,b extending between the sealing portion 210 and the adjacent flange lips 202a,b and/or ends 110a,b. The body 150 can define a pair of transition shoulders 214a,b extending between the sealing portion 210 and the adjacent bore portions 206a,b. The transition shoulders 214a,b can extend radially outward with respect to the main bore axis 101 from the bore portions 206a,b to the sealing portion 210 so that the sealing portion 210 can be thicker than the bore portions 206a,b when measured in a radial direction with respect to the main bore axis 101.

The cylindrical portion 170 of the inner seat surface 152 can be parallel to the main bore axis 101. The sealing portion 210 can define a cylindrical portion 212 of the outer seat surface 154 extending from a first transition shoulder 214a of the transition shoulders 214a,b to a second transition shoulder 214b of the transition shoulders 214a,b. As shown, the cylindrical portion 212 of the outer seat surface 154 can be parallel to the main bore axis 101.

FIG. 3 is a detailed cross-sectional view of the upper shaft bore 160a of the prior art valve seat 100, taken along line 3-3 shown in FIG. 1. The bearing pad 168a can protrude radially inward from the cylindrical portion 170 of the inner seat surface 152 relative to the main bore axis 101 (shown in FIG. 1). As similarly noted above, the inner shaft opening 162a can be defined at an intersection between the shaft bore surface 166a and the seat bearing surface 169a. Specifically, the inner shaft opening 162a can be defined by a right-angle corner 362 at the intersection between the shaft bore surface 166a and the seat bearing surface 169a.

The outer seat surface 154 can define a boss 364 extending radially outward from the cylindrical portion 212 with respect to the main bore axis 101 (shown in FIG. 1). The boss 364 can define the outer shaft opening 164a. The boss 364 can define a sidewall thickness $T_1$, measured from the shaft bore surface 166a radially outward to an outer circumferential surface 366 of the boss 364, relative to the shaft bore axis 161. The boss 364 can define a height H, measured from a portion of the outer seat surface 154 surrounding the boss 364 axially outwards to the outer shaft opening 164a, relative to the shaft bore axis 161. For the boss 364 of the prior art valve seat 100, a ratio of the height H divided by the sidewall thickness $T_1$ can be greater than four (4). The outer circumferential surface 366 can define an outer boss diameter $D_1$. A ratio of the outer boss diameter $D_1$ divided by the sidewall thickness $T_1$ for the boss 364 can be greater than 23.

Figure 4:
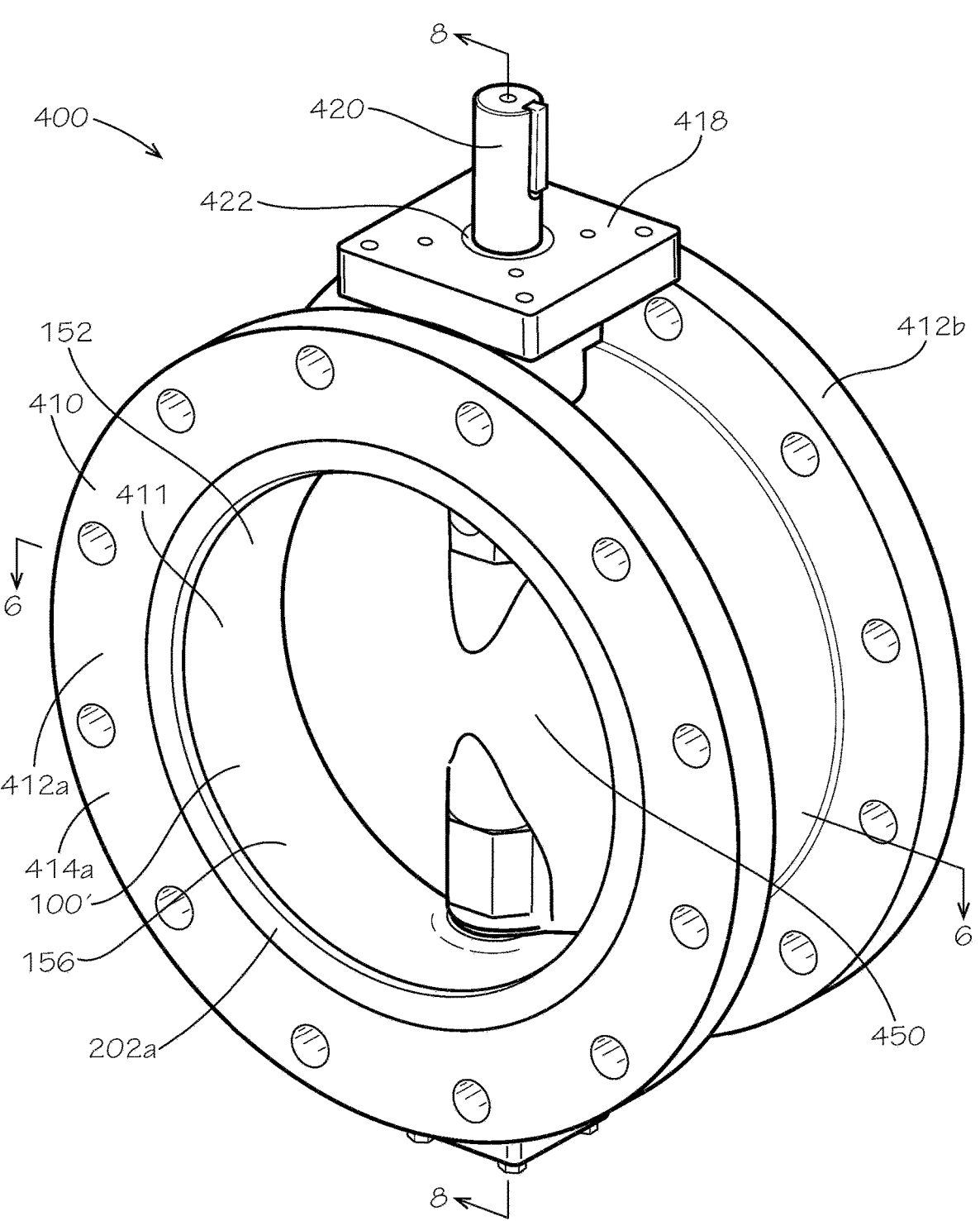
FIG. 4 is a perspective view of a valve comprising an improved valve seat, a valve body, a shaft, an upper gland, and a valve member in accordance with one aspect of the present disclosure.
Figure 5:
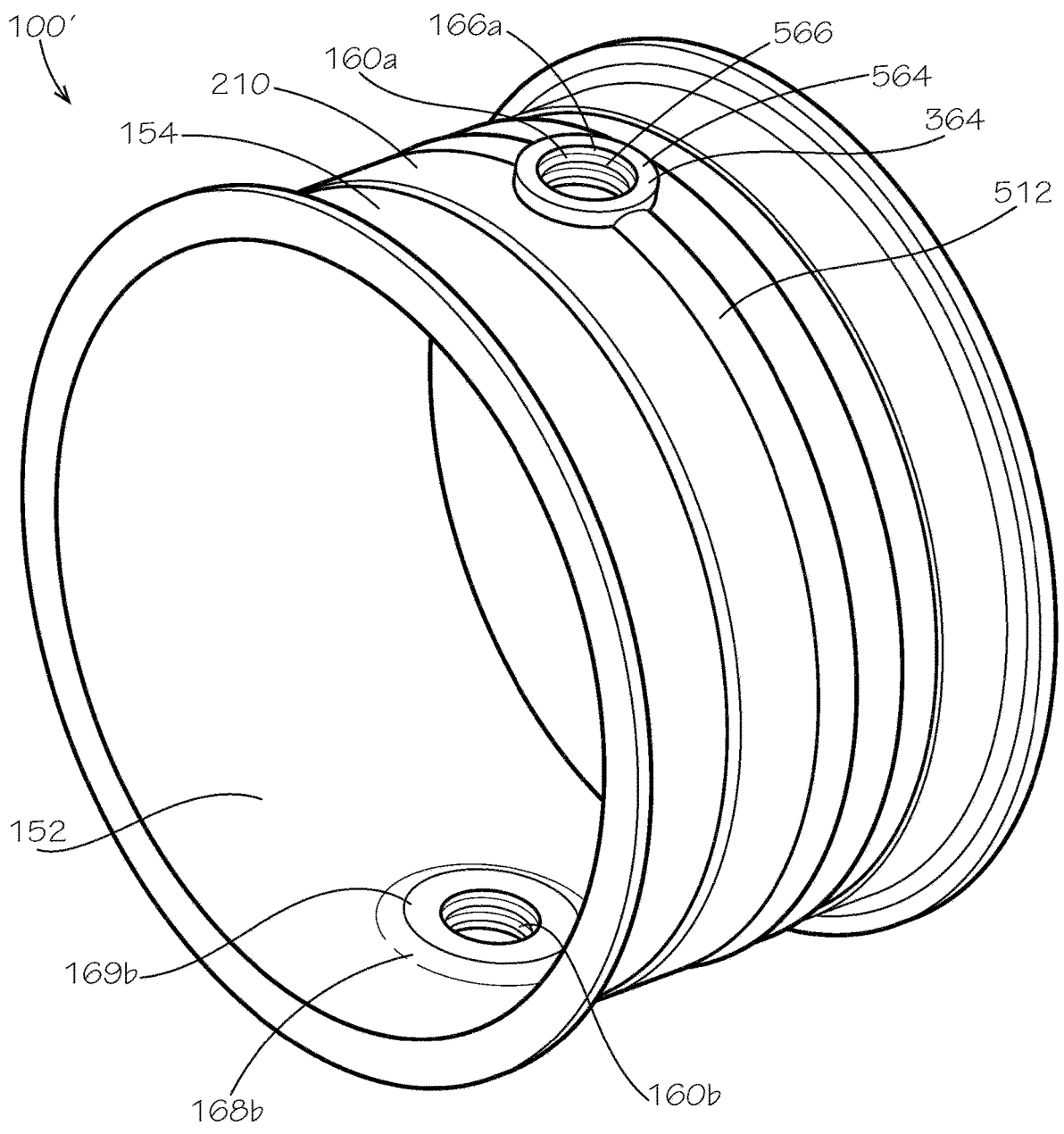
FIG. 5 is a perspective view of the valve seat of FIG. 4.

FIG. 4 is a perspective view of the valve 400 comprising the valve seat 100', a valve body 410, a shaft 420, an upper gland 422, and a valve member 450 in accordance with one aspect of the present disclosure. Discussion of the valve seat 100' may refer back to features disclosed with respect to FIGS. 1-3 of the prior art valve seat 100 where those structures are similar or identical, as well as to identify differences between the prior art valve seat 100 and the disclosed valve seat 100'.

The valve body 410 can define a first flange 412a and a second flange 412b positioned opposite from the first flange 412a. A main valve bore 411 can extend through the valve body 410 from the first flange 412a to the second flange 412b. The valve seat 100' can be positioned within the main valve bore 411, and the valve seat 100' can be bonded to the valve body 410.

Figure 6:
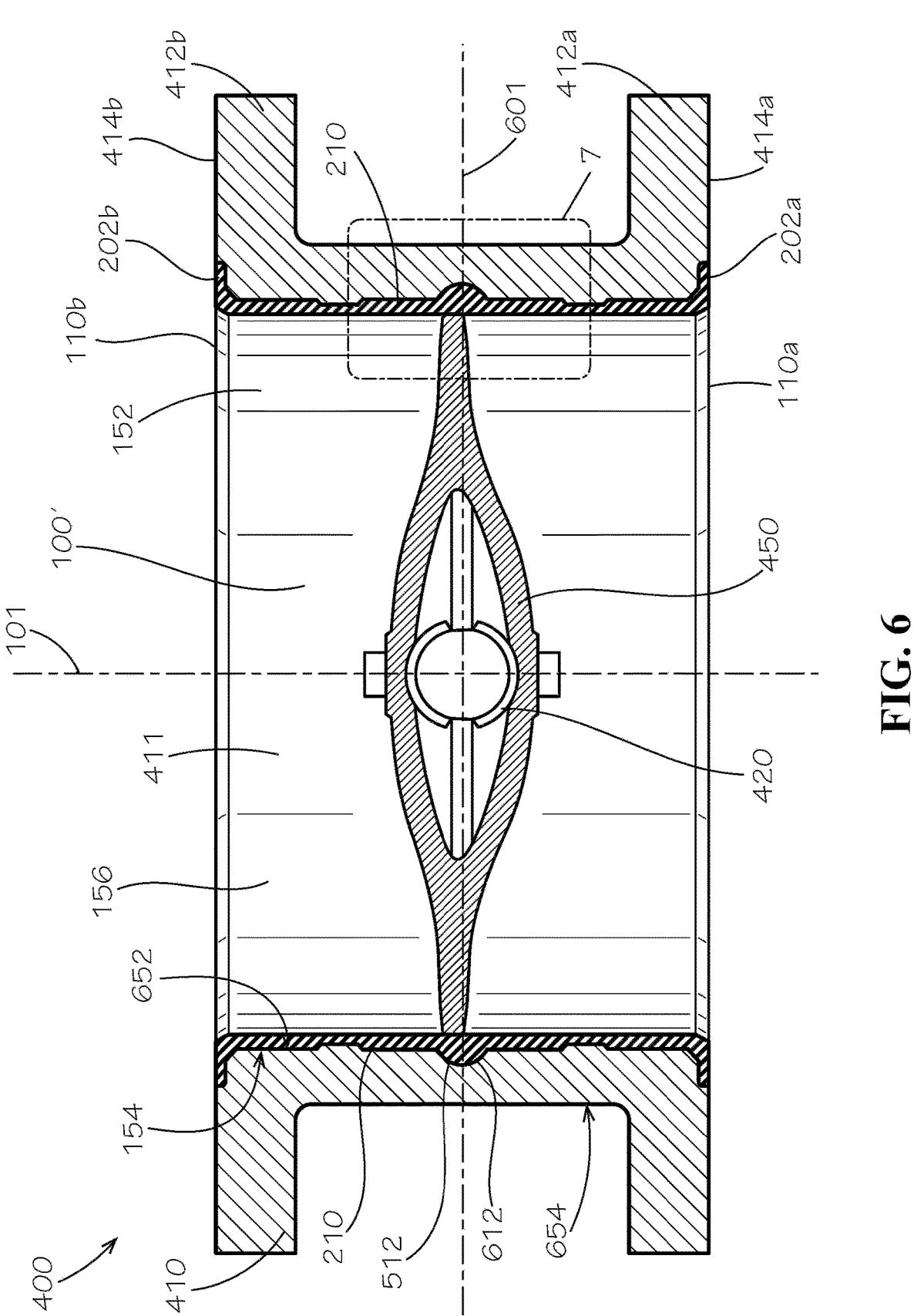
FIG. 6 is a cross-sectional view of the valve of FIG. 4, taken along line 6-6 shown in FIG. 4.

As demonstrated by the first flange 412a, the flanges 412a,b, can define flange faces 414a,b (flange face 414b shown in FIG. 6). The flange lips 202a,b (flange lip 202b shown in FIG. 6) of the valve seat 100' can be positioned flush with the flange faces 414a,b. In other aspects, the flange lips 202a,b can stand proud of the adjacent flange faces 414a,b.

The valve body 410 can define an upper gland flange 418 positioned between the flanges 412a,b. The upper gland flange 418 can receive the shaft 420 and the upper gland 422, which can form a seal between the valve body 410 and the shaft 420. The upper gland flange 418 can be configured for mounting a valve actuator (not shown), such as a quarter-turn manual actuator, a gear box, or a motor, for example and without limitation. Mounting the valve actuator to the upper gland flange 418 can compress the upper gland 422, thereby energizing the upper gland 422.

Figure 8:
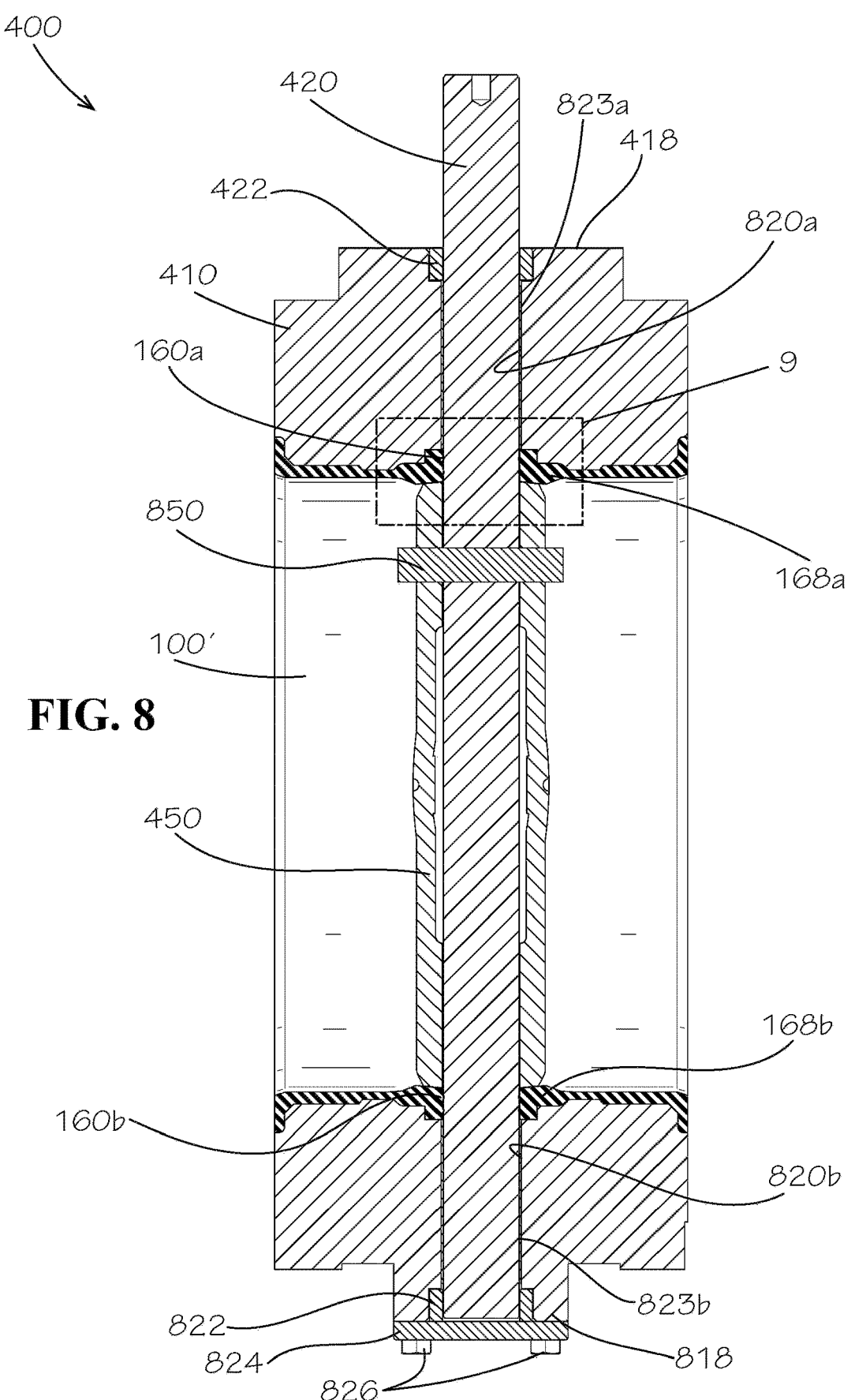
FIG. 8 is a cross-section of the valve of FIG. 4, taken along line 8-8 shown in FIG. 4.

The shaft 420 can extend through the valve body 410 and through the main valve bore 411. The shaft 420 can extend through the valve member 450, as shown in FIGS. 6 and 8. As shown in FIG. 4, the valve member 450 can be a disc, and the valve 400 can be a butterfly valve. The valve member 450 can be positioned within the main bore 156. The valve member 450 is shown in a closed position, wherein the valve member 450 can seal with the inner seat surface 152 of the valve seat 100' to block the main bore 156 of the seat 100'. The valve member 450 can be rotated about and between the closed position and an open position (not shown), wherein the valve member 450 can be positioned sideways in the main bore 156, thereby allowing a fluid to pass around the valve member 450 through the main bore 156. The shaft 420 can be rotationally fixed to the valve member 450. Rotating the shaft 420, such as with the valve actuator, can rotate the valve member 450 about and between the closed position and the open position.

FIG. 5 is a perspective view of the valve seat 100' of FIG. 4. The valve seat 100' can incorporate numerous improvements over the prior art valve seat 100 of FIG. 1.

One improvement is that in place of the cylindrical portion 212 (shown in FIG. 2) of the prior art valve seat 100, the outer seat surface 154 of the valve seat 100' can define a circumferential sealing rib 512, which can extend circumferentially around the sealing portion 210 of the valve seat 100'. As shown, the circumferential sealing rib 512 can intersect and support the boss 364. The circumferential sealing rib 512 is discussed below in greater detail with respect to FIGS. 6-7C.

Another improvement is that the boss 364 can be a reinforced boss 564, as discussed in greater detail below with respect to FIG. 10B.

Another improvement is that at least one annular rib 566 can be defined within the shaft bores 160a,b, as demonstrated by upper shaft bore 160a, wherein the shaft bore surface 166a can define the at least one annular rib 566. The at least one annular rib 566 is discussed below in greater detail with respect to FIG. 10A.

Another improvement is that a shape of the seat bearing surfaces 169a,b (seat bearing surface 169a shown in FIG. 3) defined by the bearing pads 168a,b (bearing pad 168a shown in FIG. 3) can be nonplanar, as discussed in greater detail below with respect to FIGS. 9A-10B. For example, the seat bearing surfaces 169a,b can be concavely shaped.

Valve seats 100' manufactured in accordance with the present disclosure can comprise one or more of the disclosed improvements. Some aspects may not comprise each of the disclosed improvements. Various aspects of the valve seat 100' can comprise any combination of the disclosed improvements.

FIG. 6 is a cross-sectional view of the valve 400 of FIG. 4, taken along line 6-6 shown in FIG. 4. The valve body 410 can define an inner body surface 652 and an outer body surface 654. The inner body surface 652 can define the main valve bore 411 extending from the first flange 412a to the second flange 412b. The valve seat 100' can be positioned within the main valve bore 411, and the main valve bore 411 can be substantially coaxial with the main bore 156 of the valve seat 100' about the main bore axis 101.

In some aspects, the valve body 410 can be a casting, which can define a rough surface that can include pores, hairline cracks, and residual roughness imprinted from the mold, such as when cast in a sand-based mold for example and without limitation. The outer seat surface 154 of the valve seat 100' can be bonded to the inner body surface 652 of the valve body 410. The valve seat 100' can comprise a resilient material, such as a rubber, polymer, or other suitable material, that can engage the rough surface to adhere, or bond, the valve seat 100' to the valve body 410. The bond between the valve seat 100' and the valve body 410 can also act as a seal that prevents materials, such as fluids, from passing between the valve body 410 and the valve seat 100', such as where the flange lips 202a,b overlay a portion of the flanges 412a,b positioned radially inward from the flange faces 414a,b.

In the closed position (shown), the valve member 450 can seal with the inner seat surface 152 of the valve seat 100' at the sealing portions 210. The circumferential sealing rib 512 can be positioned approximately opposite from where the valve member 450 contacts the inner seat surface 152 in the closed position. A center plane 601 can bisect the valve seat 100' and the valve 400 so that the center plane 601 is positioned normal to the main bore axis 101 and equidistant from the first end 110a and the second end 110b of the valve seat 100'. In the present aspect, the center plane 601 can bisect the circumferential sealing rib 512.

The inner body surface 652 of the valve body 410 can define a circumferential sealing groove 612 shaped and sized complimentary to the circumferential sealing rib 512. The circumferential sealing groove 612 can receive the circumferential sealing rib 512. The center plane 601 can bisect the circumferential sealing groove 612 in the present aspect.

Figure 7A:
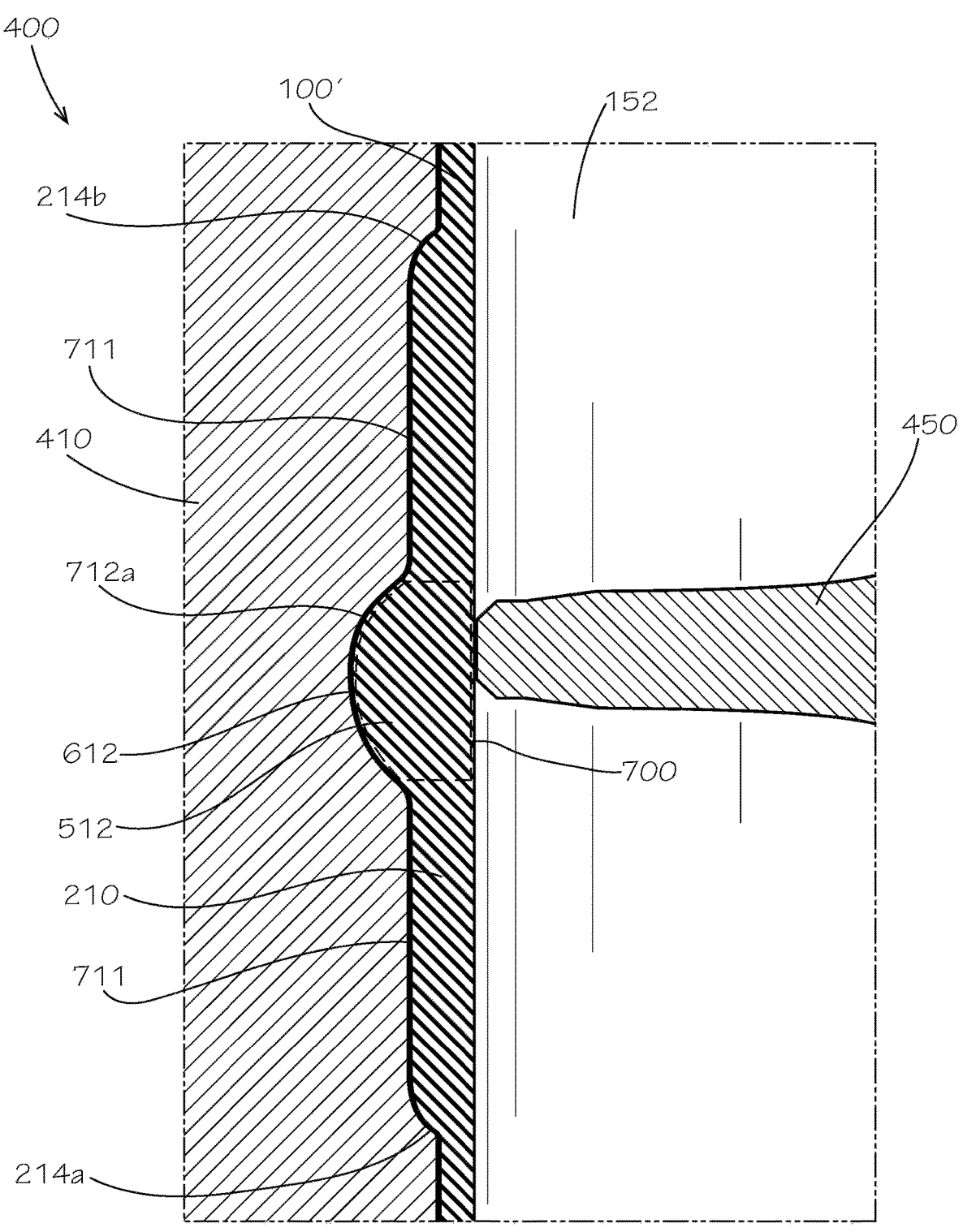
FIG. 7A is a detailed cross-sectional view of the valve of FIG. 4, taken from detail 7 shown in FIG. 6.
Figure 7B:
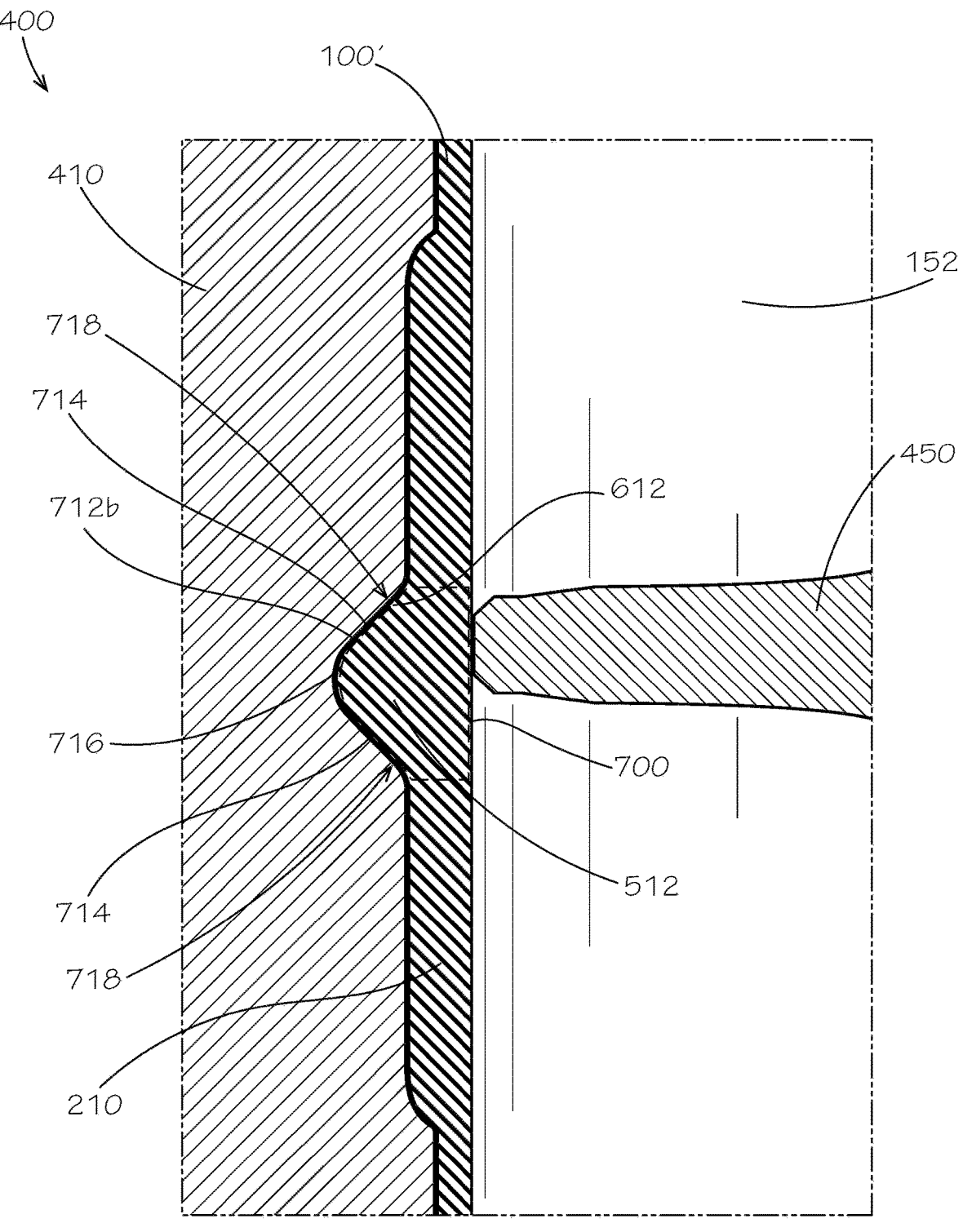
FIG. 7B is a detailed cross-sectional view of the valve of FIG. 4, taken from detail 7 shown in FIG. 6 in accordance with another aspect of the present disclosure.
Figure 7C:
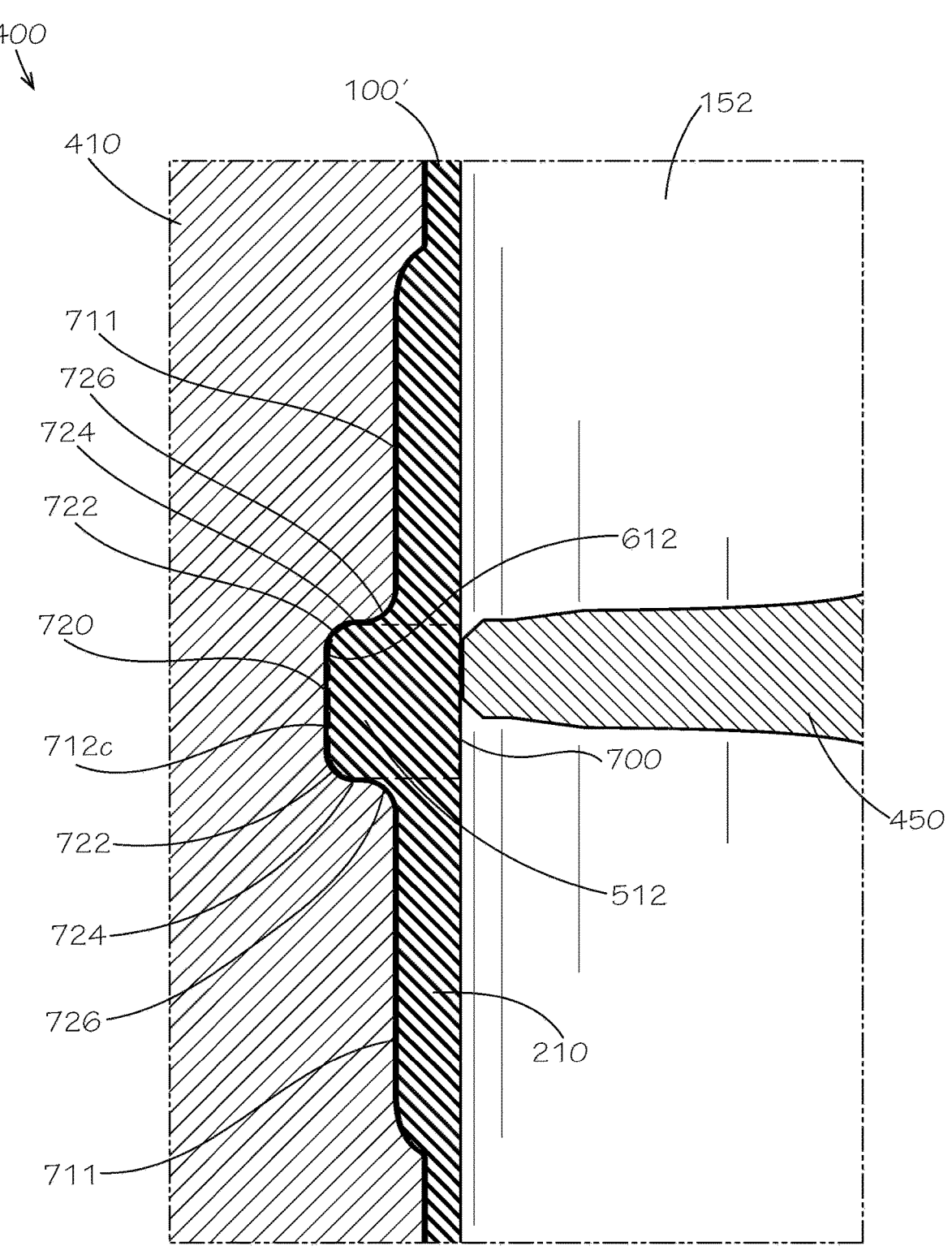
FIG. 7C is a detailed cross-sectional view of the valve of FIG. 4, taken from detail 7 shown in FIG. 6 in accordance with another aspect of the present disclosure.

FIGS. 7A-C are detailed cross-sectional views of the valve 400 of FIG. 4, taken from detail 7 shown in FIG. 6. FIGS. 7A-C demonstrate various cross-sectional shapes of the circumferential sealing rib 512.

Turning to FIG. 7A, in place of the cylindrical portion 212 (shown in FIG. 2) of the prior art valve seat 100 (shown in FIG. 2) extending from the first transition shoulder 214a of the transition shoulders 214a,b to the second transition shoulder 214b, here, the sealing portion 210 of the valve seat 100' can define the circumferential rib 512 extending radially outward with respect to the main bore axis 101 (shown in FIG. 6). The circumferential sealing rib 512 can be centered between a pair of cylindrical sub-portions 711, each extending from the circumferential sealing rib 512 to the adjacent transition shoulder 214a,b. In the aspect shown, the circumferential sealing rib 512 of the valve seat 100' and the circumferential sealing groove 612 of the valve body 410 can each define an arcuate cross-sectional shape 712a. In some aspects, the arcuate cross-sectional shape 712a can define a constant radius of curvature, such as an arc of a circle. In some aspects, the arcuate cross-sectional shape 712a can define a variable radius of curvature, such as an arc of an oval, ellipse, or other rounded geometric shape.

FIG. 7B illustrates a different shape of the circumferential sealing rib 512 of the valve seat 100' and the circumferential sealing groove 612 of the valve body 410 according to another aspect of the present disclosure. In the aspect shown, the circumferential sealing rib 512 and the circumferential sealing groove 612 can each define a V-shaped cross-sectional shape 712b. In cross-section, the V-shaped cross-sectional shape 712b can comprise a pair of linear sides 714 meeting at a rounded tip 716. In other aspects, the pair of linear sides 714 can directly intersect to form a pointed tip (not shown). The pair of linear sides 714 can correspond to a pair of frustoconical surfaces 718 of the circumferential sealing rib 512 and circumferential sealing groove 612.

FIG. 7C illustrates another shape of the circumferential sealing rib 512 of the valve seat 100' and the circumferential sealing groove 612 of the valve body 410 according to yet another aspect of the present disclosure. In the aspect shown, the circumferential sealing rib 512 and the circumferential sealing groove 612 can each define a U-shaped cross-sectional shape 712c. In cross-section, the U-shaped cross-sectional shape 712c can comprise an outer cylindrical portion 720, a pair of convex transitions 722, a pair of side portions 724, and a pair of concave transitions 726. Each concave transitions 726 can be positioned between one of the side portions 724 and one of the cylindrical sub-portions 711. Each convex transition 722 can be positioned between one of the side portions 724 and the outer cylindrical portion 720. The outer cylindrical portion 720 can be parallel to the main bore axis 101 (shown in FIG. 6). The side portions 724 can be linear in the present aspect. In some aspects, the side portions 724 can be parallel to one another and perpendicular to the outer cylindrical portion 720. In the aspect shown, the side portions 724 can taper towards the outer cylindrical portion 720.

In each of the aspects of FIGS. 7A-C, the valve member 450 can contact the inner seat surface 152 of the valve seat 100' opposite from the circumferential sealing rib 512. The valve member 450 can comprise a rigid material, such as a metal for example and without limitation, while the valve seat 100' can comprise a resilient material as discussed above. The valve member 450 can be sized to interfere with the valve seat 100' in the closed position (shown) so that the valve seat 100' elastically deforms due to pressure exerted by the valve member 450. The pressure exerted by the valve member 450 on the valve seat 100' can be in the radial direction with respect to the main bore axis 101 (shown in FIG. 6).

Deformation from the valve member 450 can compress the circumferential sealing rib 512 into the circumferential sealing groove 612, which can control, or limit, deformation of the valve seat 100' in the sealing portion 210 to create a compressed region 700 at least partially bounded between the valve member 450 and the circumferential sealing groove 612. In material science and solid mechanics, Poisson's Effect causes deformation, such as expansion, of a material in directions perpendicular to the direction of compressive loading. Here, as the valve member 450 compresses the valve seat 100' in the radial direction, the compressed region 700 can be biased to expand in the axial direction with respect to the main bore axis 101, which would partially relieve the compressive stress of the compressed region 700. However, the circumferential sealing groove 612 can partially confine the compressed region 700 in both the radial and axial directions, thereby maintaining a high degree of compressive stress in the compressed region 700. Specifically, the compressed region 700 can be maintained in a three-dimensional compressive state, which can provide a more stable and reliable seal between the valve seat 100' and the valve member 450 compared to the prior art valve seat 100 (shown in FIG. 1).

By comparison, when the sealing portion 210 of the prior art valve seat 100 is compressed by the valve member 450 in the radial direction with respect to the main bore axis 101 (shown in FIG. 6), Poisson's Effect can cause the sealing portion 210 to deform in the axial direction, thereby reducing the compressive stress between valve member 450 and the prior art valve seat 100.

FIG. 8 is a cross-section of the valve 400 of FIG. 4, taken along line 8-8 shown in FIG. 4. The shaft 420 can extend through the valve body 410, the valve seat 100', and the valve member 450. The valve body 410 can define an upper body shaft bore 820a and a lower body shaft bore 820b, and the shaft 420 can extend through the body shaft bores 820a,b. The valve 400 can comprise a pair of bearing sleeves 823a,b. The bearing sleeves 823a,b can be respectively positioned within the body shaft bores 820a,b, and the bearing sleeves 823a,b can prevent direct contact between the shaft 420 and the body shaft bores 820a,b. The bearing sleeves 823a,b can comprise a bearing material. For example and without limitation, the bearing material can be chosen for its hardness, such as bronze, its low coefficient of friction, such as polytetrafluoroethylene, or a combination of these properties, such as high density polyethylene.

The valve 400 can further comprise a lower gland 822, a bottom plate 824, and at least one fastener 826. The lower gland 822 can form a seal between the shaft 420 and the lower body shaft bore 820b, similar to how the upper gland 422 can form a seal between the shaft 420 and the upper body shaft bore 820a. The valve body 410 can define a lower gland flange 818, and the bottom plate 824 can be coupled to the lower gland flange 818 by the fasteners 826. The bottom plate 824 can compress the lower gland 822, thereby energizing the lower gland 822 and the seal formed with the shaft 420 and lower body shaft bore 820b.

The shaft 420 can extend through the valve member 450, and the valve member 450 can be secured to the shaft 420 by a pin 850. The pin 850 can rotationally fix the valve member 450 to the shaft 420 so that the shaft 420 can be turned to rotate the valve member 450 about and between the open position (not shown) and the closed position (shown in FIG. 8).

The shaft 420 can also extend through the upper shaft bore 160a and the lower shaft bore 160b of the valve seat 100'. The valve member 450 can engage and seal with the bearing pads 168a,b.

Figure 9A:
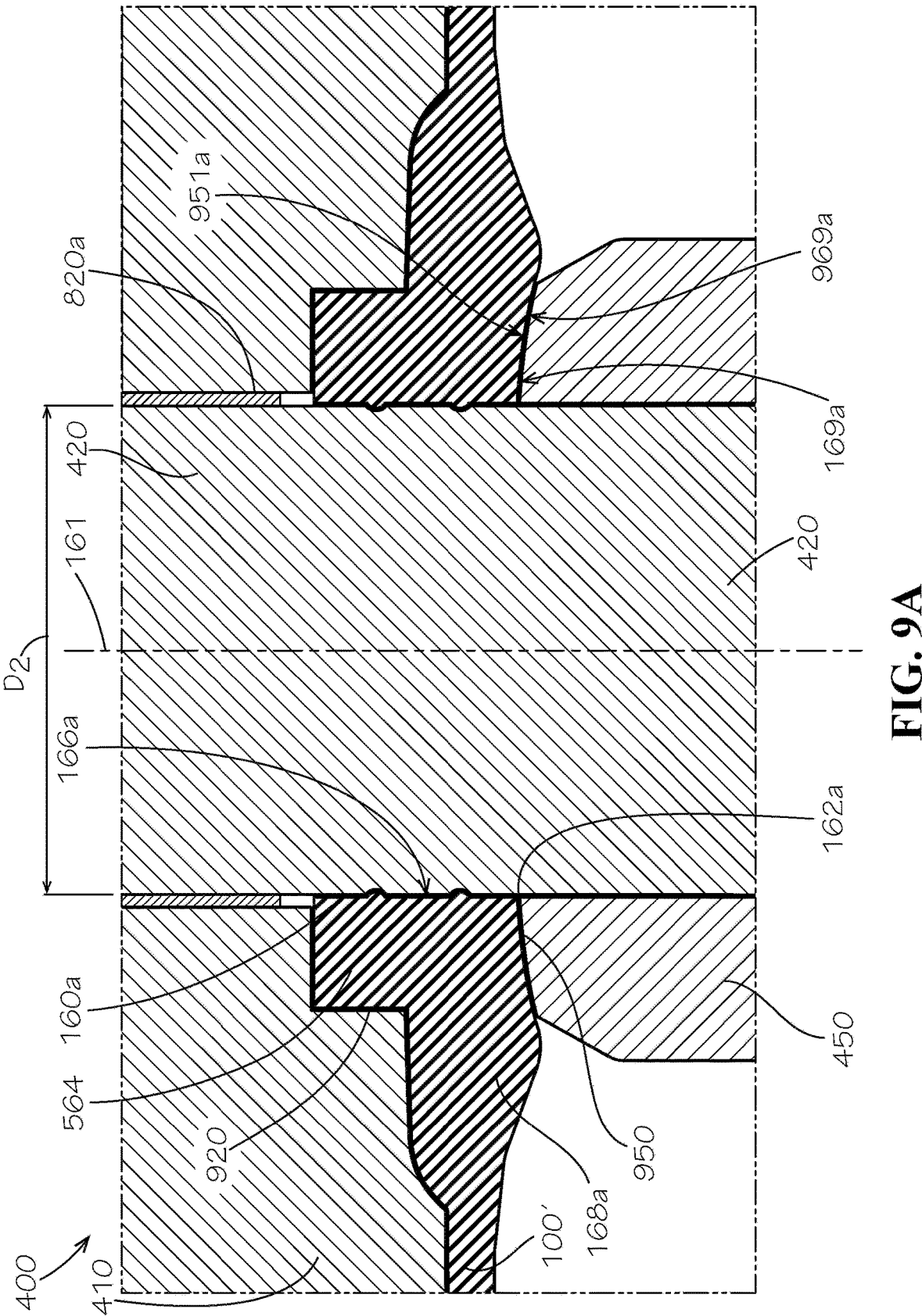
FIG. 9A is a detailed cross-sectional view of an upper bearing pad of the valve seat of the valve of FIG. 4, taken from detail 9 shown in FIG. 8.
Figure 9B:
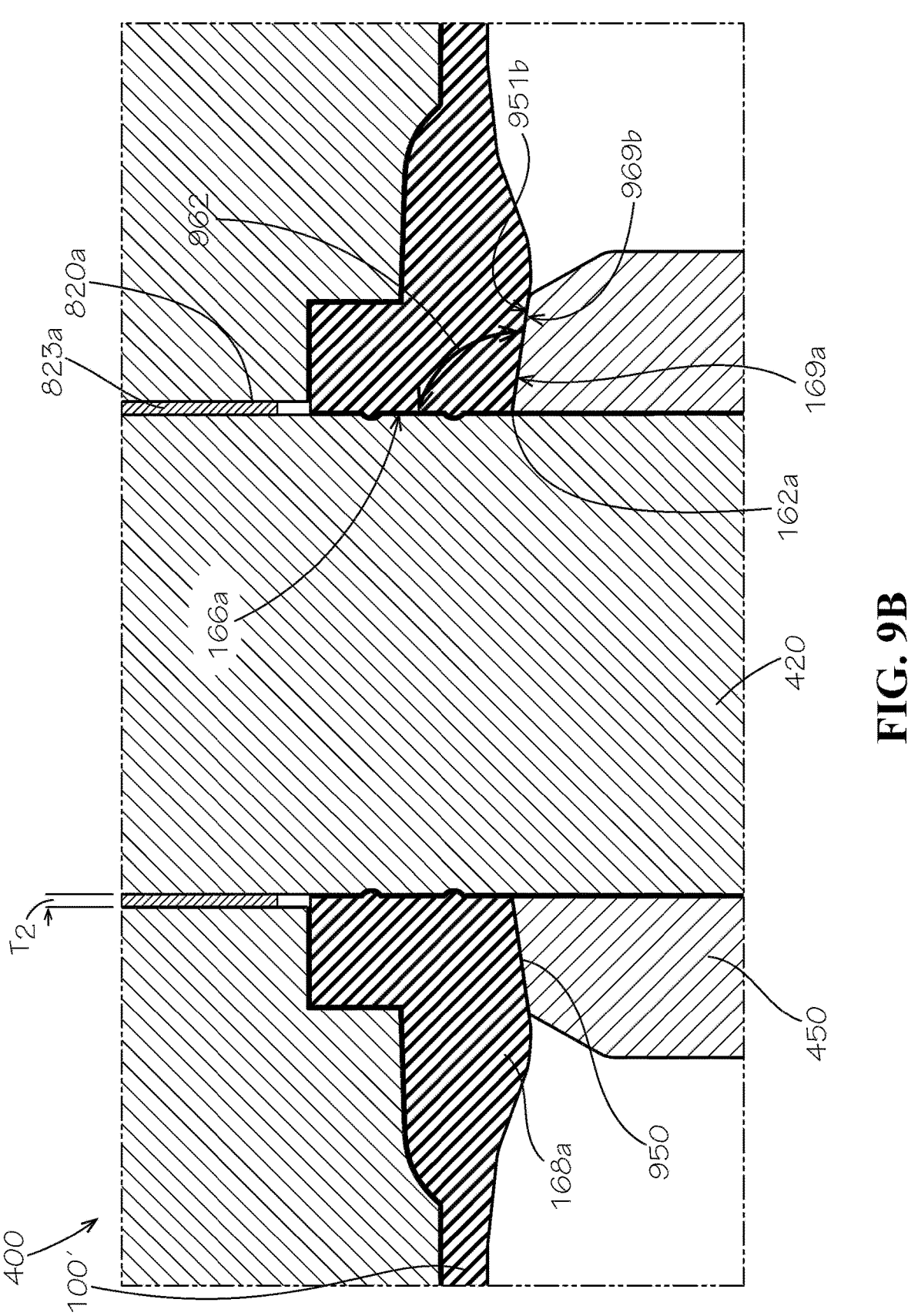
FIG. 9B is a detailed cross-sectional view of the upper bearing pad of the valve seat of the valve of FIG. 4, taken from detail 9 shown in FIG. 8 in accordance with another aspect of the present disclosure.
Figure 10A:
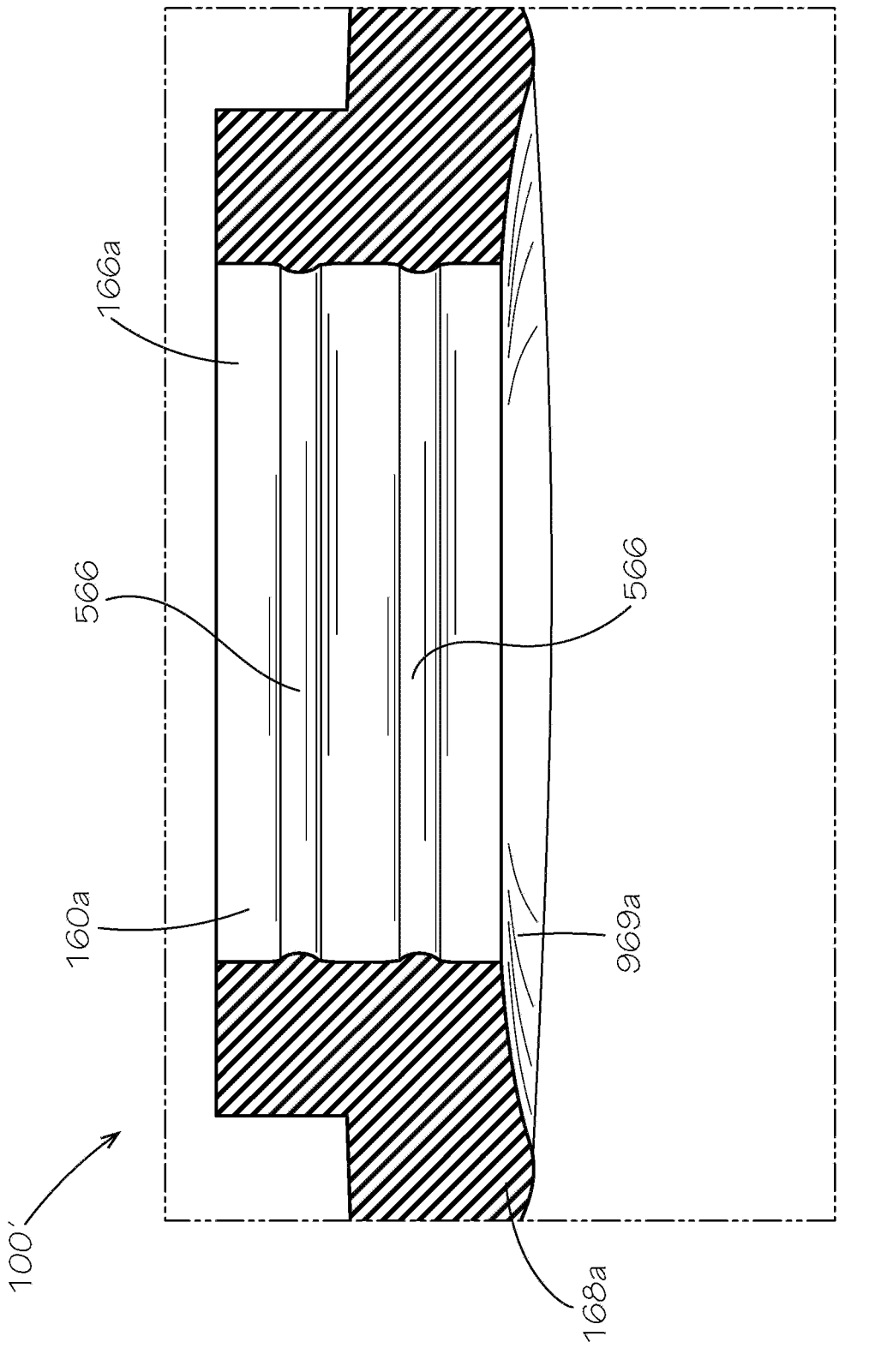
FIG. 10A is a detailed cross-sectional view of the upper bearing pad of the valve seat of FIG. 4, taken from detail 9 shown in FIG. 8.
Figure 10B:
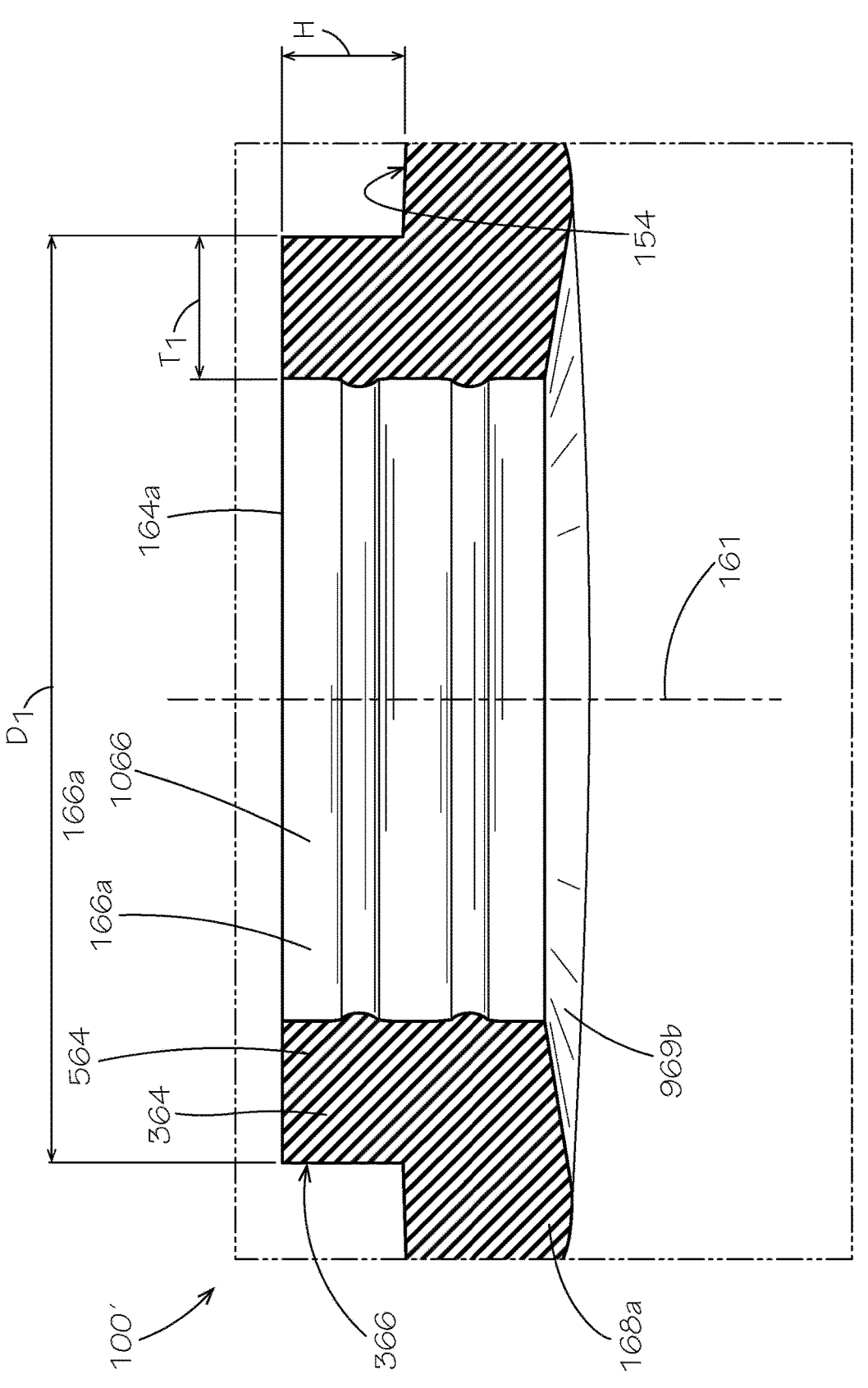
FIG. 10B is a detailed cross-sectional view of the upper bearing pad of the valve seat of FIG. 4, taken from detail 9 shown in FIG. 8 in accordance with another aspect of the present disclosure.

FIGS. 9A and 9B are detailed cross-sectional views of the upper bearing pad 168a of the valve seat 100' of the valve 400, taken from detail 9 shown in FIG. 8. The discussion of the upper bearing pad 168a can be equally applicable to the lower bearing pad 168b (shown in FIG. 8).

As shown in FIG. 9A, the shaft 420 can define a shaft diameter $D_2$.

The valve member 450 can have an interference fit between the upper bearing pad 168a and the lower bearing pad 168b (shown in FIG. 8), wherein the valve member 450 can exert axial compressive forces on the bearing pads 168a,b relative to the shaft bore axis 161 of the upper shaft bore 160a. The valve body 410 can define a boss recess 920 where the reinforced boss 564 meets the upper body shaft bore 820a. The boss recess 920 can be enlarged in the radial direction with respect to the shaft bore axis 161 compared to the upper body shaft bore 820a, and the boss recess 920 can receive the reinforced boss 564. Due to the upward axial compressive force of the valve member 450 acting on the upper bearing pad 168a, the reinforced boss 564 can be compressed within the boss recess 920 and against the shaft 420 in a three-dimensional compressive state. Due to the Poisson Effect, the axial compression of the reinforced boss 564 can induce radial expansion, with respect to the shaft bore axis 161, which can cause the reinforced boss 564 to seal with the shaft 420. As noted above, the bonded nature of the valve seat 100' and the valve body 410 can create a seal between the valve seat 100' and the valve body 410, including between the reinforced boss 564 and the boss recess 920. The three-dimensional compressive state of the reinforced boss 564 can provide a more stable and reliable seal between the valve seat 100' and the shaft 420.

Compared to the prior art valve seat 100 (shown in FIG. 1) wherein the bearing pad 168a defines a seat bearing surface 169a that is planar, here, the valve seat 100' can define a seat bearing surface 169a that is concave. Specifically, the seat bearing surface 169a can be a spherical zone 969a. In geometry, a spherical segment is the solid formed by cutting a sphere, or ball, with a pair of parallel planes. A spherical zone is the surface defined by the spherical segment. The inner shaft opening 162a can be defined at an intersection of the spherical zone 969a and the shaft bore surface 166a.

An end 950 of the valve member 450 can define a valve member end surface 951a. The valve member end surface 951a can define a convex shape. Specifically, the valve member end surface 951a can be shaped as a spherical zone, complimentary to the spherical zone 969a.

FIG. 9B demonstrates another concave shape of the seat bearing surface 169a according to another aspect of the present disclosure. In the aspect shown, the seat bearing surface 169a can be a frustoconical surface 969b. The inner shaft opening 162a can be defined at an intersection of the frustoconical surface 969b and the shaft bore surface 166a, and an angle 962 measured between the shaft bore surface 166a and the frustoconical surface 969b through the valve seat 100' can be an obtuse angle.

The valve member end surface 951b defined by the end 950 of the valve member 450 can define a convex shape. Specifically, the valve member end surface 951b can be shaped as a frustoconical surface, complimentarily to the frustoconical surface 969b. In some aspects, the valve member 450 with the valve member end surface 951a of FIG. 9A, shaped as a spherical zone, can be mated with the frustoconical surface 969b, shown in FIG. 9B. In some aspects, the valve member 450 with the valve member end surface 951b of FIG. 9B, shaped as a frustoconical surface, can be mated with the spherical zone 969a, shown in FIG. 9A.

Compared to the planar seat bearing surfaces 169a,b (169b shown in FIG. 1) of the prior art valve 100 (shown in FIG. 1), contact between the convex shapes, such as the spherical zone 969a (shown in FIG. 9A) and the frustoconical surface 969b, of the seat bearing surface 169a and the complimentarily shaped end 950 can reduce the rotational torque from friction required to rotate the valve member 450 against the seat bearing surface 169a. Additionally, the convex shapes can prevent the valve seat 100' from shifting relative to the valve member 450 when the valve 400 is pressurized because the convex seat bearing surfaces 169a can receive and center the end 950 of the valve member 450. By preventing seat shift, the convex seat bearing surfaces 169a can better resist large pressure differentials across the valve member 450, such as when the valve member 450 is in the closed position with pressurized fluid acting on only one side of the valve member 450.

As shown in FIG. 9B, the bearing sleeve 823a, positioned between the shaft 420 and the upper body shaft bore 820a, can define a sleeve thickness $T_2$, which can also be representative of the bearing sleeve 823b (shown in FIG. 8).

FIGS. 10A and 10B are detailed cross-sectional views of the upper bearing pad 168a of the valve seat 100', taken from detail 9 shown in FIG. 8. FIG. 10A further shows the spherical zone 969a, and FIG. 10B further shows the frustoconical surface 969b.

As further shown in FIG. 10A, rather than the purely cylindrical shaft bore surface 166a of the prior art valve seat 100 (shown in FIG. 1), here, the shaft bore surface 166a can define at least one annular rib 566 within the upper shaft bore 160a. Specifically, the shaft bore surface 166a can define two annular ribs 566; however, in other aspects, the shaft bore surface 166a can define greater or fewer than two annular ribs 566. The shaft bore surface 166a can otherwise be cylindrical with the exception of the at least one annular rib 566.

The annular ribs 566 can help to prevent leakage between the shaft 420 (shown in FIG. 9A) and the upper shaft bore 160a by distributing compressive forces of the shaft bore surface 166a against the shaft 420 over a smaller area, thereby increasing the pressure of the seal formed between the shaft 420 and the annular ribs 566 of the shaft bore surface 166a.

Additionally, the annular ribs 566 can reduce contact friction resistance between the valve seat 100' and the shaft 420 because the pattern of contact between the annular ribs 566 and the shaft 420 is of a line-contact. In other words, the pattern of contact between each annular rib 566 and the shaft 420 can be a very thin ring, approaching a theoretical two-dimensional pattern of contact, which can approximate linear contact between the valve seat 100' and the shaft 420, thereby producing less contact friction resistance than the prior art valve seat 100 (shown in FIG. 1).

As shown in FIG. 10B, the boss 364 of the valve seat 100' can be the reinforced boss 564 previously referenced with respect to FIG. 5. The reinforced boss 564 can be cylindrical in shape. As shown, the reinforced boss 564 can define a sidewall thickness $T_1$ measured between the outer circumferential surface 366 of the reinforced boss 564 and a cylindrical portion 1066 of the shaft bore surface 166a. The outer circumferential surface 366 can define an outer boss diameter $D_1$. The reinforced boss 564 can define a height H measured from a portion of the outer seat surface 154 surrounding the reinforced boss 564 to the outer shaft opening 164a, in an axially outward direction relative to the shaft bore axis 161. For the reinforced boss 564, the ratio of the height H divided by the sidewall thickness $T_1$ can be between 0.5 and 2. In the aspect shown, the ratio of the height H divided by the sidewall thickness $T_1$ can be about 1.

Additionally, for the reinforced boss 564, a ratio of the outer boss diameter $D_1$ divided by the sidewall thickness $T_1$ can be between 4 and 12. Preferably, the ratio can be between 5.5 and 8.5. In the aspect shown, the ratio can be about 6.3 to 6.8. In the present aspect, a ratio of the outer boss diameter $D_1$ of the reinforced boss 564 divided by the shaft diameter $D_2$ of the shaft 420 can be between 1.2 and 2.0. Preferably the ratio of the outer boss diameter $D_1$ of the reinforced boss 564 divided by the shaft diameter $D_2$ of the shaft 420 can be between 1.4 and 1.6. In the aspect shown, the ratio of the outer boss diameter $D_1$ of the reinforced boss 564 divided by the shaft diameter $D_2$ of the shaft 420 can be about 1.4 to 1.5. Comparatively, a ratio of the outer boss diameter $D_1$ of the boss 364 (shown in FIG. 3) divided by the shaft diameter $D_2$ of the shaft 420 can be about 1.04 to 1.05.

Referring back to the boss 364 of the prior art valve seat 100, the sidewall thickness $T_1$ of the boss 364 can be sized to be approximately equal to the sleeve thickness $T_2$ (shown in FIG. 9B) of the bearing sleeves 823a,b (shown in FIG. 8). Rather than being designed for forming a seal with the shaft 420, the primary purpose of the boss 364 is to accurately position the bearing sleeve 823a,b within the body shaft bores 820a,b (lower body shaft bore 820b shown in FIG. 8). A ratio of the sidewall thickness $T_1$ of the boss 364 (shown in FIG. 3) divided by the sleeve thickness $T_2$ of the sleeve bearing 823a can be less than 1.5. Comparatively, a ratio of the sidewall thickness $T_1$ of the reinforced boss 564 divided by the sleeve thickness $T_2$ of the sleeve bearing 823a (shown in FIG. 9b) can be greater than 3. Preferably, the ratio of the sidewall thickness $T_1$ of the reinforced boss 564 divided by the sleeve thickness $T_2$ of the sleeve bearing 823a can be greater than 6. In the present aspect, the ratio of the sidewall thickness $T_1$ of the reinforced boss 564 divided by the sleeve thickness $T_2$ of the sleeve bearing 823a can be greater than 10.

Compared to the boss 364 of the prior art valve seat 100 (shown in FIG. 1), the reinforced boss 564 can be configured to form a seal with the shaft 420. The square and closer-to-square ratios of the sidewall cross-section for the reinforced boss 564 can help to create the three-dimensional stress state discussed above with respect to FIG. 9A, thereby creating a more stable and reliable seal with the shaft 420 (shown in FIG. 9A).

Table 1, below, summarizes experimental test results for the valve 400 and valve seat 100'.

TABLE 1

| Features | Existing Product Jingmen PRATT Model 12" 2F2 250B BFV | Experimental Prototypes | | | |
| --- | --- | --- | --- | --- | --- |
| | | Prototype #1 | Prototype #2 | Prototype #4 | Prototype #5 |
| Circumferential Sealing Rib 512 | None | Arcuate cross-sectional shape 712a | Arcuate cross-sectional shape 712a | Arcuate cross-sectional shape 712a | Arcuate cross-sectional shape 712a |
| Seat Bearing Surface 169a,b | Planar | Planar | Spherical zone 969a | Planar | Spherical zone 969a |
| Annular Ribs 566 | None | Included | Included | Included | Included |
| Boss 364 | Unreinforced | Reinforced boss 564 | Reinforced boss 564 | Reinforced boss 564 | Reinforced boss 564 |
| Composition of Valve member 450 | N/A | Bronze alloy | Bronze Alloy | Ductile Iron | Ductile Iron |
| Operating Torque Test Results | | | | | |
| Unseating torque @ zero psi (N*m) | 990 | 750 | 450 | 825 | 700 |
| Seating torque @ zero psi (N*m) | 990 | 750 | 450 | 860 | 700 |
| Unseating torque @ 250 psi (N*m) | N/A | 975 | 525 | 1150 | 960 |
| Leak Test Results (psi) | 275 | 650 | 700 | 700 | 700+ |

As shown above, five prototypes of various aspects of the valve 400 with different combinations of features were created and tested against the prior art Model 12" 2F2 250B BFV butterfly valve made by Jingmen PRATT. The existing product and the prototypes were tested for operating torque requirements as well as being leak tested. For the operating torque tests, the torque required to open and close the valve member 450 was measured. Unseating torque measures the peak torque required to open the valve from the closed position. Seating torque measures the peak torque required to close the valve from the open position. Unseating torque was tested at ambient pressure as well as with a 250 psi pressure differential across the valve member 450 in the closed position. As shown in Table 1, each of the prototypes improved upon the existing product by requiring less torque to operate the valve at ambient pressure.

While no operating torque data is available for the existing product, test results between the different prototypes demonstrate that prototypes with the convex seat bearing surface 169a,b, such as those shaped as a spherical zone 969a, required less torque to operate than their counterparts with the planar seat bearing surface 169a,b. For example, prototypes #1 and #2 each comprised a valve member 450 comprising a bronze alloy. The only difference between the two prototypes is that prototype #2 incorporated the improved spherical zone 969a whereas the seat bearing surface 169a,b for prototype #1 is planar, similar to that of the existing product. The test results show that prototype #2 required less torque to operate across all tests.

Looking to prototypes 190 4 and #5, each of these valves comprised a valve member 450 comprising ductile iron. The only difference between the two prototypes is that prototype #5 incorporated the improved spherical zone 969a whereas the seat bearing surface 169a,b for prototype #4 is planar, similar to that of the existing product. Again, the test results showed that the prototype with the spherical zone 969a required less torque to operate across all tests.

Turning to the leak test results, the test method comprised securing the prototypes of the valve 400 in a test fixture with the valve members 450 in the closed position. One side of the valve member 450 was exposed to pressurized water, starting at 350 psi with a 5 minute hold period. After 5 minutes, the pressure was increased by 50 psi and again held for 5 minutes. The process was repeated until the valve 400 leaked or the testing limit of the equipment was reached, which was 700 psi. The pressures listed are the pressures at which the valves 400 failed, or began to leak, with the exception of prototype #5, which reached the testing limit of the equipment without leaking.

As shown, each of the prototypes substantially improved upon the existing product. Again comparing prototype #1 against prototype #2 and prototype #4 against prototype #5, the test results show that the prototypes with seat bearing surfaces 169a,b formed as spherical zones 969a offered improved leak testing performance. While both prototype #4 and prototype #5 list 700 psi, prototype #4 failed at 700 psi while prototype #5 successfully contained 700 psi, which was the testing limit of the equipment. For this reason, the leak test failure pressure for prototype #5 is unknown, but is higher than 700 psi.

Based on the test results of Table 1, the features of the circumferential sealing rib 512, a concave seat bearing surface 169a,b, the inclusion of annular ribs 566, and the reinforced boss 564 improved the leak test results of the valves 400 while also offering improvements in operating torque requirements.

In one exemplary aspect, a valve seat can comprise a first end; a second end positioned opposite from the first end; and a body extending from the first end to the second end. The body can define an inner surface and an outer surface. The inner surface can define a main bore extending through the body from the first end to the second end. The main bore can define a main bore axis. The body can define a shaft bore extending from the inner surface to the outer surface. The shaft bore can define a shaft bore axis positioned perpendicular to the main bore axis. The shaft bore can define an inner shaft opening and an outer shaft opening. The body can define a concave seat bearing surface extending around the inner shaft opening.

In a further exemplary aspect, the outer surface can define a circumferential sealing rib extending circumferentially around the body. In a further exemplary aspect, the circumferential sealing rib can define an arcuate cross-sectional shape. In a further exemplary aspect, the circumferential sealing rib can define a V-shaped cross-sectional shape. In a further exemplary aspect, the circumferential sealing rib can define a U-shaped cross-sectional shape. In a further exemplary aspect, the circumferential sealing rib can be axially centered between the first end and the second end relative to the main bore axis. In a further exemplary aspect, the concave seat-bearing surface can be a spherical zone. In a further exemplary aspect, the concave seat bearing surface can define a frustoconical surface. In a further exemplary aspect, at least one annular rib can be defined by the body within the shaft bore.

In another exemplary aspect, a valve can comprise a valve seat defining an inner seat surface and an outer seat surface. A shaft bore can extend through the valve seat from the inner seat surface to the outer seat surface. An inner shaft opening of the shaft bore can be defined at the inner seat surface. The inner seat surface can define a concave seat bearing surface extending around the inner shaft opening; and a valve member can define an end engaging the concave seat bearing surface. The end can define a valve member end surface. The valve member end surface can define a convex shape. In a further exemplary aspect, the valve can further comprise a shaft extending through the shaft bore. The end can receive the shaft. The valve member can be rotationally fixed to the shaft.

In a further exemplary aspect, the valve can further comprise a valve body defining an inner body surface. The valve seat can be bonded to the inner body surface. The inner body surface can define a boss recess. The boss recess can receive a reinforced boss of the valve seat. The reinforced boss can define a sidewall thickness between an outer circumferential surface of the reinforced boss and a shaft bore surface of the shaft bore. The reinforced boss can define an outer shaft opening of the shaft bore. The reinforced boss can define a height between the outer shaft opening and a portion of the outer seat surface surrounding the reinforced boss. A ratio of the height divided by the sidewall thickness can define a value between 0.5 and 2.

In a further exemplary aspect, the outer seat surface can define a circumferential sealing rib extending circumferentially around the valve seat; and the valve member can contact and seal with a portion of the inner seat surface positioned opposite from the circumferential sealing rib when the valve member is in a closed position. In a further exemplary aspect, the valve can further comprise a valve body defining an inner body surface. The inner body surface can be bonded to the valve seat. The inner body surface can define a circumferential sealing groove shaped complimentary to the circumferential sealing rib. The circumferential sealing rib can be compressed between the circumferential sealing groove and the valve member in a three-dimensional stress state when the valve member is in the closed position.

In a further exemplary aspect, the valve member can be a disc, and the valve can be a butterfly valve. In a further exemplary aspect, the circumferential sealing rib can define an arcuate cross-sectional shape. In a further exemplary aspect, the circumferential sealing rib can define a U-shaped cross-sectional shape. In a further exemplary aspect, the circumferential sealing rib can define a V-shaped cross-sectional shape. In a further exemplary aspect, the concave seat bearing surface can be a spherical zone. In a further exemplary aspect, the concave seat bearing surface can define a frustoconical surface.

In another exemplary aspect, a valve seat can comprise a body defining an inner surface and an outer surface. The inner surface can define a main bore extending through the body. The body can define a shaft bore extending from the inner surface to the outer surface. The shaft bore can define an inner shaft opening. The body can define a concave seat bearing surface extending around the inner shaft opening.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve seat comprising:
a body comprising a shaft bore extending from an inner seat surface to an outer seat surface and comprising an inner shaft opening defined at the inner seat surface;
a reinforced boss surrounding the shaft bore and protruding from the outer seat surface; and
a bearing pad extending radially inward from the inner seat surface relative to a main bore axis and defining a nonplanar seat bearing surface extending around the inner shaft opening,
wherein the nonplanar seat bearing surface is concave and defines a spherical zone which intersects a shaft bore surface of the shaft bore, the nonplanar seat bearing surface having a leak testing performance to contain 700 psi, and the shaft bore defines at least one annular rib located entirely within the reinforced boss, the reinforced boss having a height H and a side-wall thickness T such that $0.5 \leq H/T \leq 2$.

2. The valve seat of claim 1, wherein the shaft bore defines an upper shaft bore, and the body further comprises a lower shaft bore extending from a lower inner shaft opening to a lower outer shaft opening.

3. The valve seat of claim 2, further comprising an upper boss within an upper boss recess and a lower boss within a lower boss recess.

4. The valve seat of claim 1, wherein the bearing pad comprises an interference fit.

5. The valve seat of claim 4, further comprising a shaft within the bearing pad, wherein the shaft comprises an interference fit within the bearing pad; and wherein the body exerts compressive forces on the bearing pad and the bearing pad exerts compressive forces on the shaft.

6. A valve comprising the valve seat of claim 1 and a valve member defining an end engaging the concave seat bearing surface and an end surface defining a convex shape.

7. The valve of claim 6, further comprising a shaft extending through the shaft bore, the end receiving the shaft, the valve member being rotationally fixed to the shaft, wherein at least one annular rib is defined within the shaft bore.

8. The valve of claim 6, further comprising a valve body defining an inner body surface, the valve seat bonded to the inner body surface, the inner body surface defining a boss recess, the boss recess receiving the reinforced boss of the valve seat, the reinforced boss defining a sidewall thickness between an outer circumferential surface of the reinforced boss and a shaft bore surface of the shaft bore, the reinforced boss defining an outer shaft opening of the shaft bore, the reinforced boss defining a height between the outer shaft opening and a portion of the outer seat surface surrounding the reinforced boss, a ratio of the height divided by the sidewall thickness defining a value between 0.5 and 2.

9. The valve of claim 6, wherein the valve member is a disc, and the valve is a butterfly valve, wherein the outer seat surface defines a circumferential sealing rib extending circumferentially around the valve seat.

10. The valve of claim 9, further comprising a valve body defining an inner body surface bonded to the valve seat, the inner body surface defining a circumferential sealing groove.

11. The valve of claim 9, wherein the circumferential sealing rib defines an arcuate cross-sectional shape and when the valve is in a closed position:

the valve member contacts and seals with a portion of the inner seat surface positioned opposite from the circumferential sealing rib; and the circumferential sealing rib compressed between a circumferential sealing groove and the valve member in a three-dimensional stress state.

12. The valve of claim 11, wherein the circumferential sealing rib is axially centered relative to a main bore axis.

13. A method comprising:

providing a valve body comprising a main bore extending through the valve body from a first end to a second end;

forming a valve seat defining an inner seat surface defining a concave seat bearing surface extending around an inner shaft opening of the inner seat surface, an outer seat surface defining a cylindrical portion, the concave seat bearing surface having a leak testing performance to contain 700 psi, a reinforced boss surrounding a shaft bore and protruding from the outer seat surface, the reinforced boss having a height H and a side-wall thickness T such that $0.5 \leq H/T \leq 2$, and at least one annular rib in the shaft bore located entirely within the reinforced boss; and assembling a valve member defining an end engaging the concave seat bearing surface and an end surface defining a convex shape.

14. The method of claim 13, wherein forming the valve seat to define the nonplanar seat bearing surface further comprises forming a spherical zone in the concave seat bearing surface intersecting a shaft bore surface of the shaft bore.

15. The method of claim 13, wherein forming the outer seat surface comprises forming a circumferential sealing rib extending circumferentially around the valve seat.

\* \* \* \* \*